United States Patent
Kondo

(10) Patent No.: US 7,595,797 B2
(45) Date of Patent: Sep. 29, 2009

(54) TRANSFORMING A POLYGONIZED OBJECT INTO AN IMPLICIT-FUNCTION REPRESENTATION

(75) Inventor: Nobuhiro Kondo, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 199 days.

(21) Appl. No.: 10/579,686

(22) PCT Filed: Aug. 5, 2005

(86) PCT No.: PCT/JP2005/014806

§ 371 (c)(1),
(2), (4) Date: May 18, 2006

(87) PCT Pub. No.: WO2006/014029

PCT Pub. Date: Feb. 9, 2006

(65) Prior Publication Data

US 2008/0186310 A1    Aug. 7, 2008

(30) Foreign Application Priority Data

Aug. 6, 2004    (JP)    ............... 2004-231193

(51) Int. Cl.
*G06T 1/00* (2006.01)
*G06T 15/00* (2006.01)
*G06T 17/00* (2006.01)

(52) U.S. Cl. .................. 345/418; 345/419; 345/420

(58) Field of Classification Search ............... None
See application file for complete search history.

(56) References Cited

U.S. PATENT DOCUMENTS

| 6,441,816 | B1 |   | 8/2002  | Nguyen et al. |          |
|-----------|----|---|---------|---------------|----------|
| 6,498,607 | B1 | * | 12/2002 | Pfister et al. | 345/423 |
| 6,718,291 | B1 | * | 4/2004  | Shapiro et al. | 703/2   |
| 2008/0074419 | A1 | * | 3/2008 | Museth et al. | 345/420 |

FOREIGN PATENT DOCUMENTS

| EP | 1 081 656 A2 | 3/2001 |
| EP | 1 081 656 A3 | 3/2003 |
| WO | WO 2006/014029 A1 | 2/2006 |

OTHER PUBLICATIONS

Kobbelt and Botsch, "Freeform Shape Representations for Efficient Geometry Processing", *Proceedings of the Shape Modeling International 2003 (SMI'03)*.

(Continued)

*Primary Examiner*—Peter-Anthony Pappas
*Assistant Examiner*—Daniel F Hajnik
(74) *Attorney, Agent, or Firm*—Sprinkle IP Law Group

(57) ABSTRACT

An image processing method using a computer includes extracting vertex coordinates (S13) of a triangular-shaped polygon, setting a region (S14) surrounding the triangular-shaped polygon (TP) on the basis of the vertex coordinates, measuring a distance (S15) from a lattice point included in the region to the triangular-shaped polygon (TP), and drawing a graphic figure (S21). The graphic figure is drawn on the basis of the distance from the lattice point to the triangular-shaped polygon (TP).

20 Claims, 21 Drawing Sheets
(2 of 21 Drawing Sheet(s) Filed in Color)

OTHER PUBLICATIONS

Sigg et al., "Signed Distance Transform Using Graphics Hardware," *Computer Graphics Laboratory, Computer Science Dept.*, ETH Zürich, CH-8092 Zürich, Switzerland, 2003.

Tanaka et al., "The Cubic Interpolated Level Set Method for Realistic Fluid Animation," *ACM Proc. of the SIGGRAPH 2003 Conference on Sketch and Applications*, Jul. 27-31, 2003.

Enright et al., "Animation and Rendering of Complex Water Surfaces," *ACM Proc. of the SIGGRAPH 2002*, pp. 736-744, Jul. 23-26, 2002.

International Search Report for PCT/JP2005/014806, 2005.

\* cited by examiner $\phi(\vec{r})=0$

Rectangular-shaped polygon     Triangular-shaped polygon

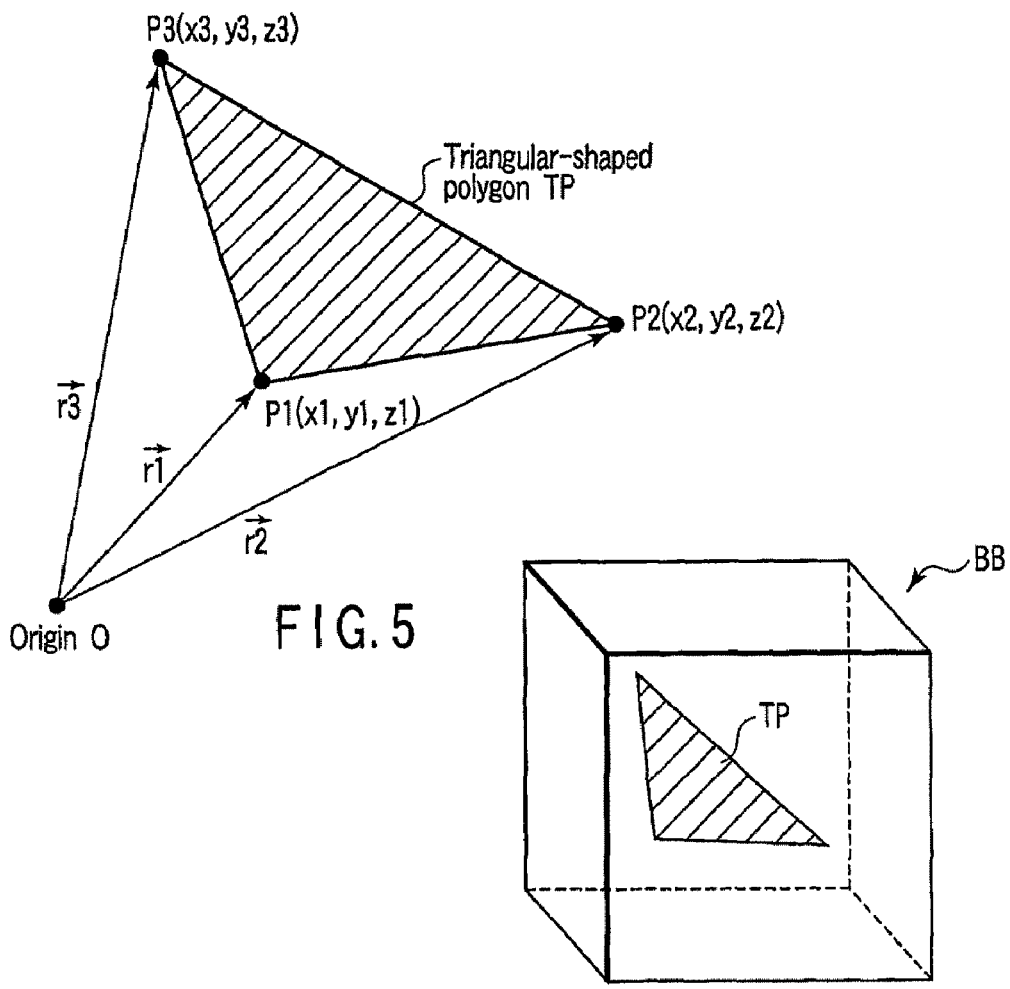
FIG. 5
FIG. 6
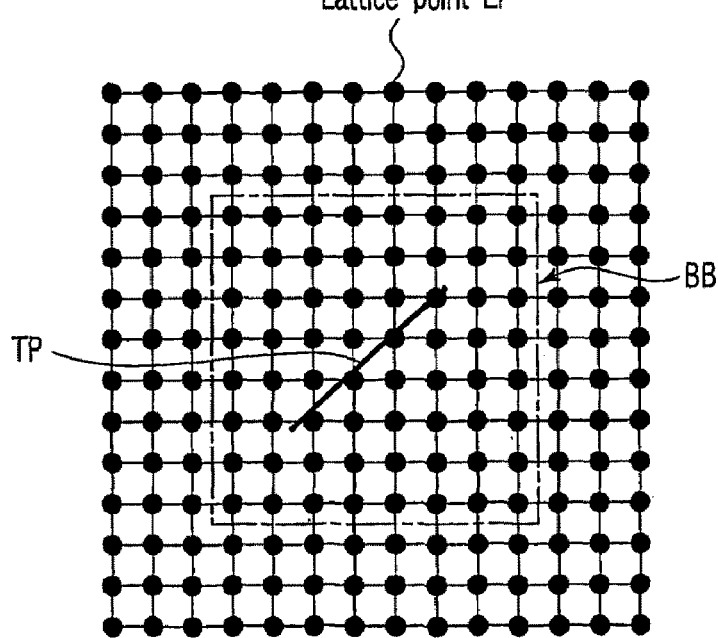
FIG. 7

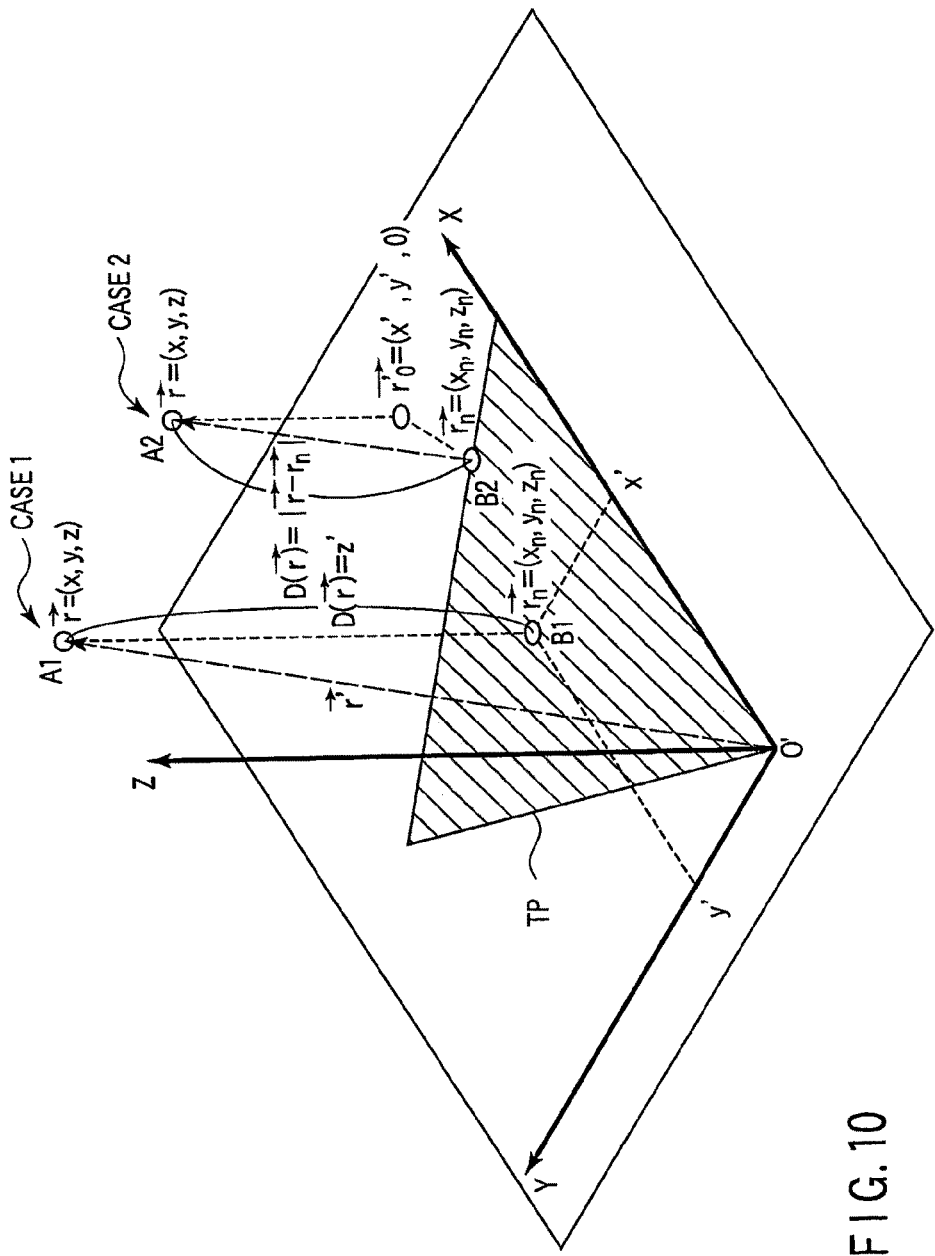
F I G. 10

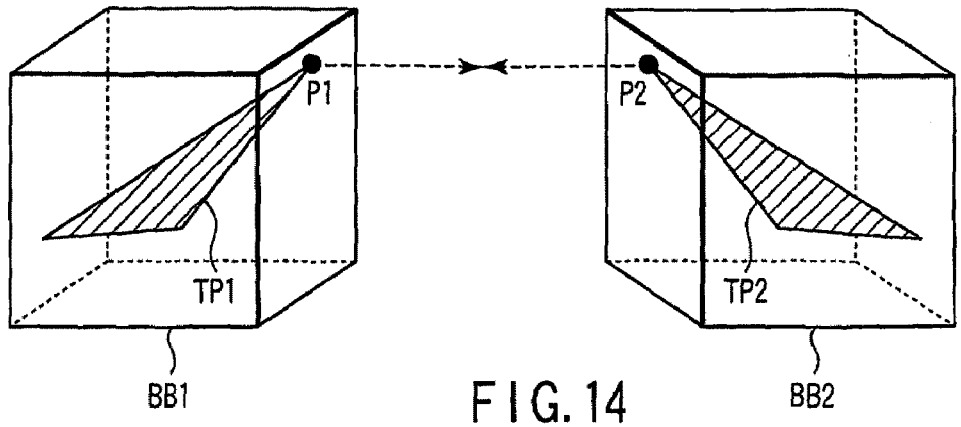
FIG. 14
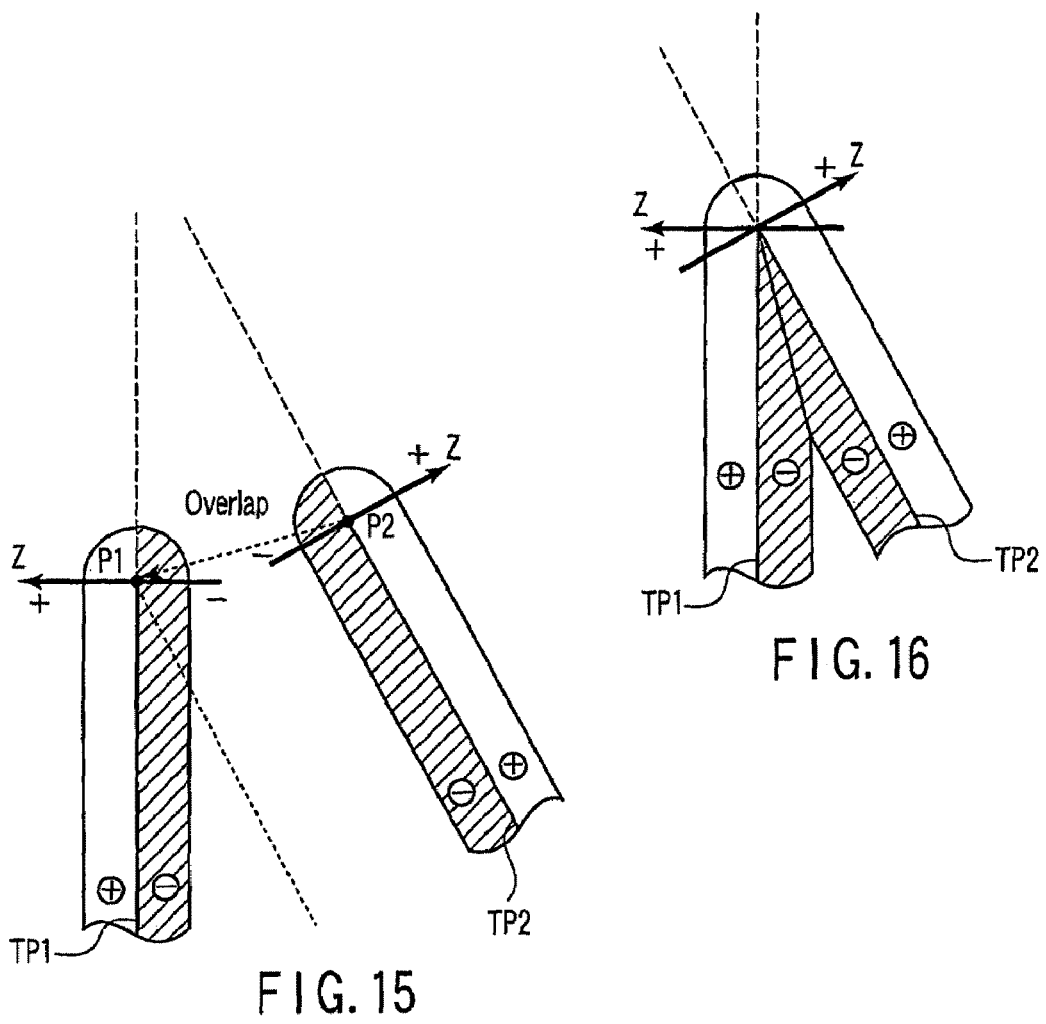
FIG. 15
FIG. 16 implicit function
(mesh:90 × 90 × 90)

polygon
(vertex:8754, face:17504)

implicit function
(mesh:90 × 90 × 90)

polygon
(vertex:8754, face:17504)

X-Y plane

X-Z plane

Y-Z plane

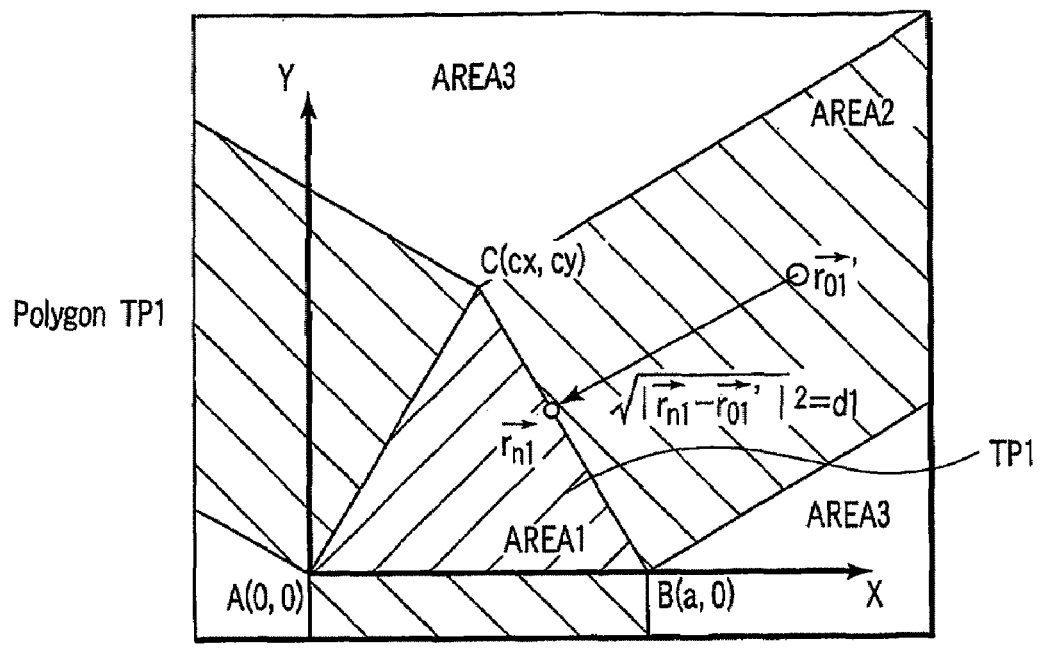
F I G. 34
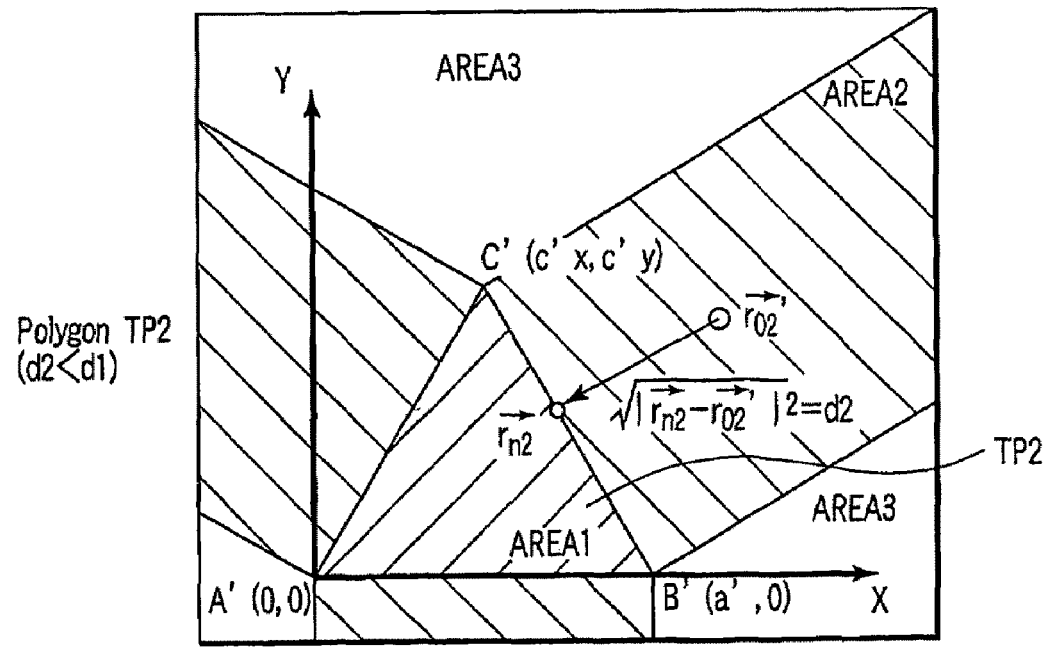
F I G. 35

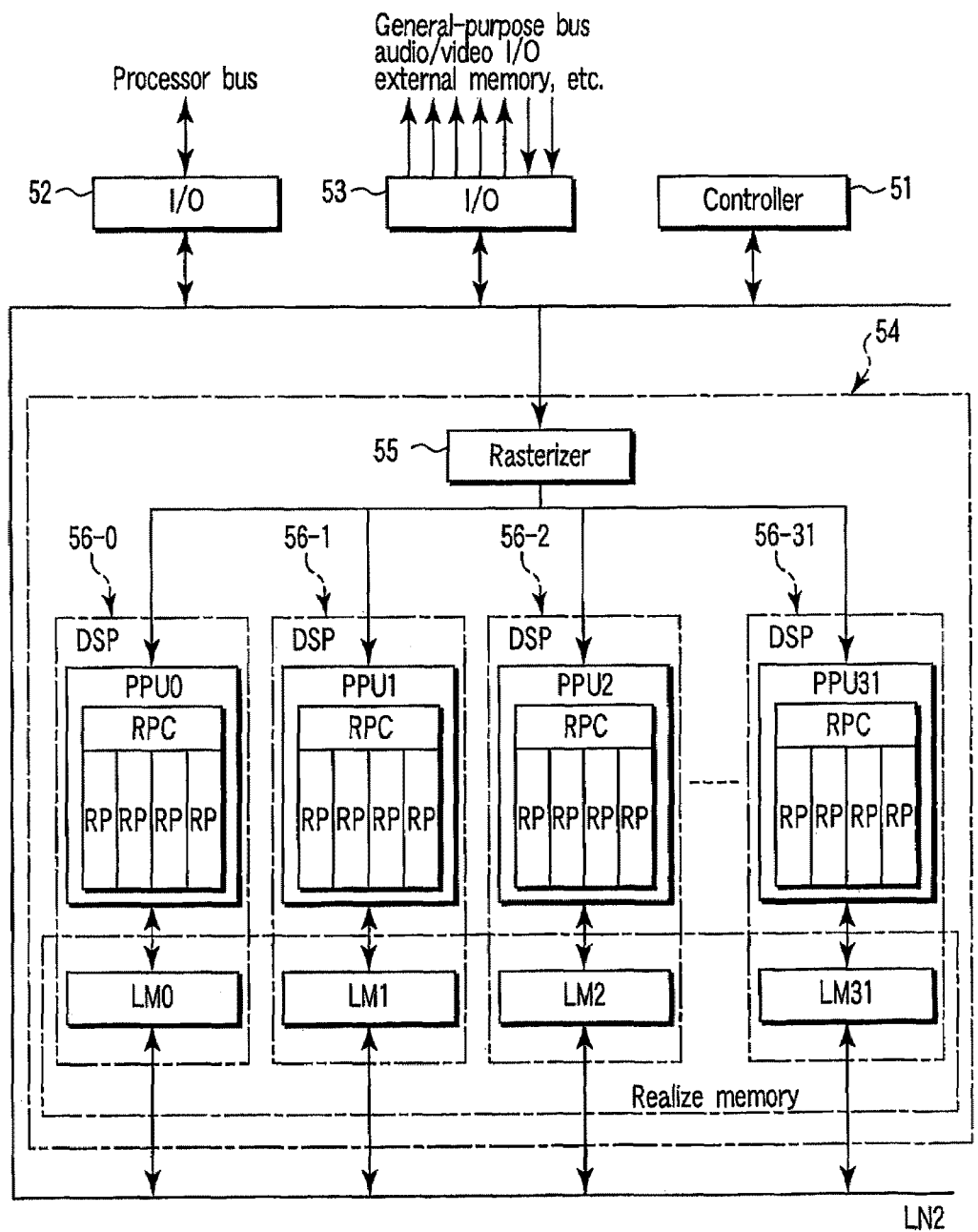
F I G. 37

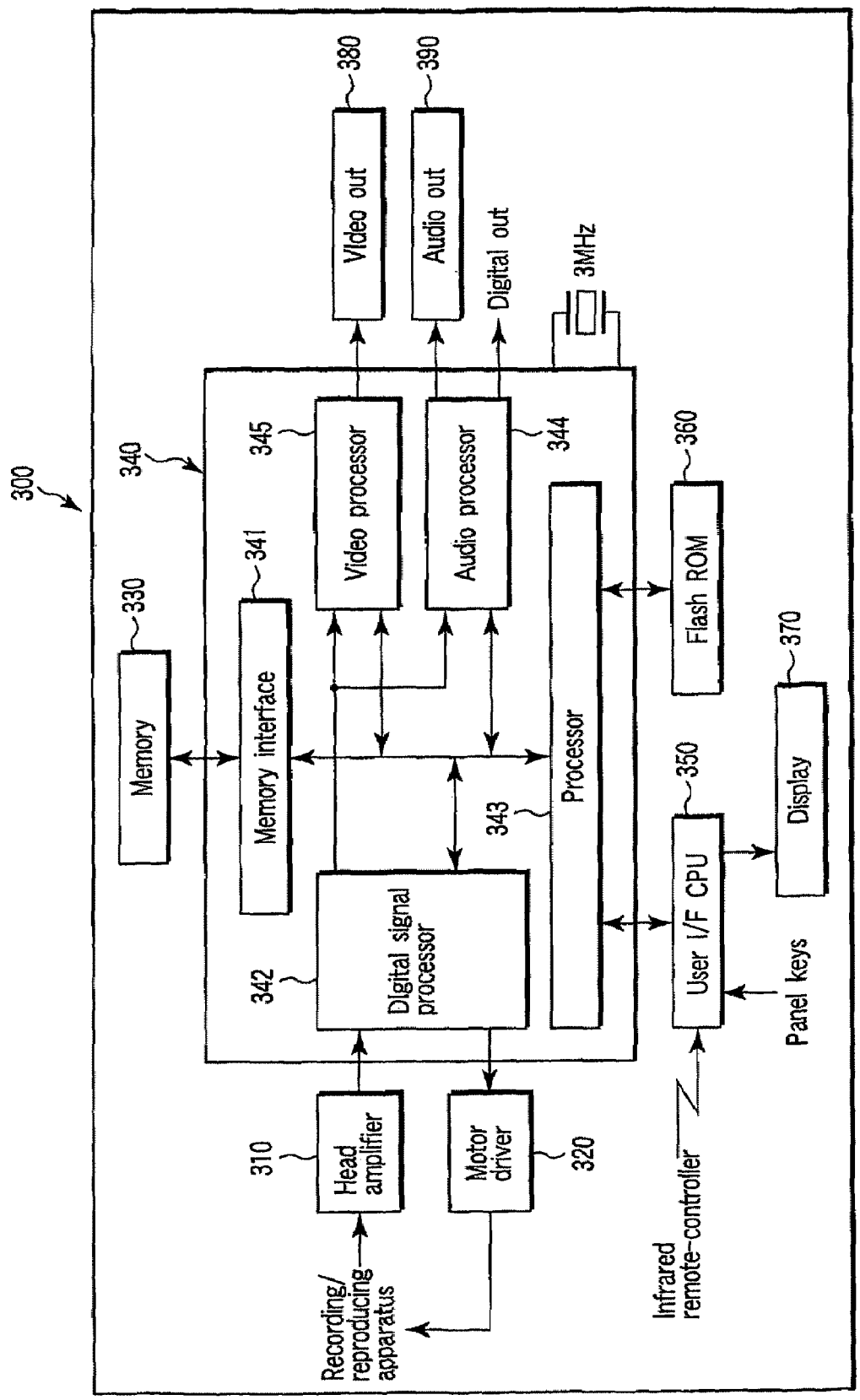
F I G. 39

TRANSFORMING A POLYGONIZED OBJECT INTO AN IMPLICIT-FUNCTION REPRESENTATION

CROSS-REFERENCE TO RELATED APPLICATIONS

This application is based upon and claims the benefit of priority under U.S.C. §371 from PCT International Application No. PCT/JP2005/014860, which claims benefit of prior Japanese Patent Application No. 2004-231193, filed Aug. 6, 2004, the entire contents of which are incorporated herein by reference.

TECHNICAL FIELD

The present invention relates generally to an image processing method, an image processing program product and an image processing apparatus, and more particularly to a scheme of transforming, for example, a polygonized object to an implicit-function representation.

BACKGROUND ART

In the prior art, in the field of computer graphics and CADs, an implicit-function representation or a parametric representation using polygons, etc. has been used as means for representing the shape of an object.

A method of modeling an organic object shape by an implicit-function representation is disclosed, for instance, in T. Nishita and E. Nakamae, "A Method for Displaying Metaballs by Using Bézie Clipping," Proceeding of EUROGRAPHICS, 1994. In this method, a plurality of implicit surfaces, such as meatballs, are combined. In addition, a scheme of generating implicit surfaces by fitting curved surfaces to roughly defined point-group data is proposed in G. Turk and J. F. O'Brien, "Shape Transformation Using Variational Implicit Surface," Proceeding of SIGGRAPH, 1999.

In these schemes using implicit surfaces, however, it is difficult to represent details of a complex character. If surface data that represents a detailed shape is to be generated, a high computational cost is required.

In recent years, schemes called "level set methods", wherein implicit surfaces are generated using signed distance functions, have been proposed, for instance, in S. Osher and R. Fedkiw, "Level Set Methods: An Overview and Some Recent Results," Journal of Computational Physics, Vol. 169, 2001, and D. Enright, S. Marschner and R. Fedkiw, "Animation and Rendering of Complex Water Surface," Proceeding of SIGGRAPH, 2002. The advantage of using a signed distance function is that shape information can be represented with accuracy. Thus, when fluid animation is to be produced, this scheme is used as a representation method for accurately handling a variation in surface shape of a fluid.

The above prior art, however, merely discloses how to more accurately represent a variation in shape of an object that has a specified simple shape represented by an implicit function. The prior art is silent on a concrete scheme as to how to represent an object by an implicit function. There has been no proposal for a scheme for generally applying an implicit function to not only a simple-shape object but to a complex-shape object.

DISCLOSURE OF INVENTION

The present invention has been made in consideration of the above-described problems, and the object of the present invention is to provide an image processing method, a computer program product for processing image data and a image processing apparatus which can apply an implicit function to objects represented using polygons.

An image processing method using a computer, according to an aspect of the present invention, includes: extracting vertex coordinates of a triangular-shaped polygon; setting a region surrounding the triangular-shaped polygon on the basis of the vertex coordinates; measuring a distance from a lattice point included in the region to the triangular-shaped polygon; and drawing a graphic figure on the basis of the distance from the lattice point to the triangular-shaped polygon.

A computer program product for processing image data, according to another aspect of the present invention, includes: means for instructing a computer to extract vertex coordinates of a triangular-shaped polygon; means for instructing the computer to generate a region surrounding the triangular-shaped polygon on the basis of the vertex coordinates; means for instructing the computer to measure a distance from a lattice point included in the region to the triangular-shaped polygon; and means for instructing the computer to draw a graphic figure on the basis of the distance from the lattice point to the triangular-shaped polygon.

An image processing apparatus according to another aspect of the present invention includes: an input unit configured to receive polygon data; a processing unit configured to generate a region surrounding an individual polygon, which is represented by the polygon data, measure a distance from a lattice point included in the region to the polygon, and draw a graphic figure on the basis of the measured distance by an implicit-function representation; and an outputting unit configured to display the graphic figure that is obtained by the implicit-function representation.

BRIEF DESCRIPTION OF DRAWINGS

The file of this patent contains photographs executed in color. Copies of this patent with color photographs will be provided by the Patent and Trademark Office upon request and payment of the necessary fee.

FIG. 5 is a conceptual view illustrating a step of obtaining vertex coordinates of a triangular-shaped polygon in the image processing method and the image processing program according to the first embodiment;

FIG. 6 is a three-dimensional conceptual view illustrating a step of generating a bounding box in the image processing method and the image processing program according to the first embodiment;

FIG. 7 is a two-dimensional conceptual view illustrating a step of generating the bounding box in the image processing method and the image processing program according to the first embodiment;

FIG. 10 is a three-dimensional conceptual view illustrating a step of finding a signed minimum distance in the image processing method and the image processing program according to the first embodiment;

FIG. 14 is a three-dimensional conceptual view illustrating a step of rendering an object by an implicit function in the image processing method and the image processing program according to the first embodiment;

FIG. 15 is a two-dimensional conceptual view illustrating a step of rendering the object by the implicit function in the image processing method and the image processing program according to the first embodiment;

FIG. 16 is a two-dimensional conceptual view illustrating a step of rendering the object by the implicit function in the image processing method and the image processing program according to the first embodiment;

FIG. 34 is a two-dimensional conceptual view illustrating a step of finding a signed minimum distance in the image processing method and the image processing program according to the third embodiment, FIG. 34 being an X-Y plane at a time when the signed minimum distance is found using two polygons;

FIG. 35 is a two-dimensional conceptual view illustrating a step of finding a signed minimum distance in the image processing method and the image processing program according to the third embodiment, FIG. 35 being an X-Y plane at a time when the signed minimum distance is found using two polygons;

FIG. 37 is a block diagram of an arithmetic process unit in the image processor system LSI that includes the image processing method, image processing program and image processing computer according to the fourth embodiment of the invention;

FIG. 39 is a block diagram of a recording/reproducing apparatus that includes the image processing method, image processing program and image processing computer according to the first to third embodiments.

BEST MODE FOR CARRYING OUT THE INVENTION

Embodiments of the present invention will now be described with reference to the accompanying drawings. In the embodiments described below, an arrow used in, e.g.

"(r→)", represents a vector, and does not mean "derivation" in a symbol logic or "image" in a set theory.

Figure 1:
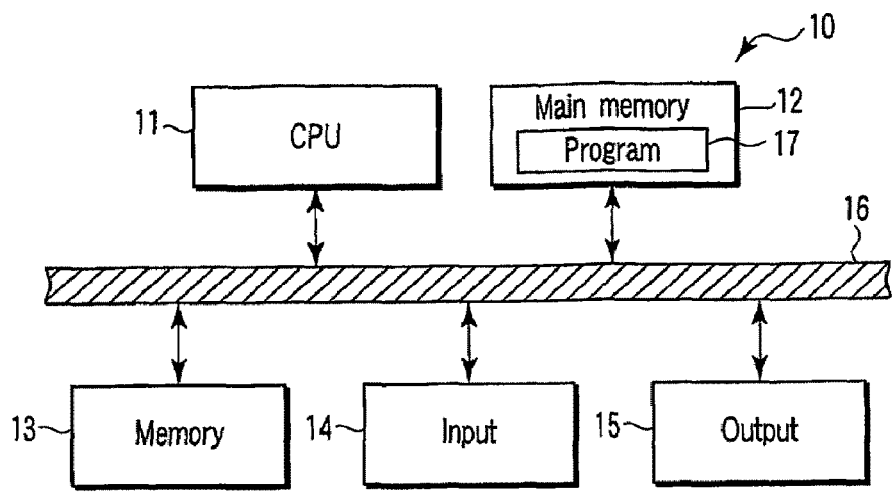
FIG. 1 is a block diagram of an image processing computer according to a first embodiment of the present invention.

Referring to FIG. 1, a description is given of an image processing method, an image processing program product and an image processing computer according to a first embodiment of the invention. FIG. 1 is a block diagram showing the internal configuration of the image processing computer according to the embodiment.

As is shown in FIG. 1, an image processing computer 10 according to the embodiment comprises a CPU 11, a main memory 12, a memory 13, an input device 14, an output device 15 and a data bus 16.

When an image process is executed, the CPU 11 reads out an image process program 17 from the memory 13 and loads it in the main memory 12. The CPU 11 executes the image process according to the image process program 17 that is loaded in the main memory 12. In the image process, the main memory 12 stores data, which is frequently used by the CPU 11, as well as the image process program product 17. The memory 13 is, e.g. a readable/writable nonvolatile semiconductor memory. The memory 13 stores various programs and data. The input device 14 receives data from outside. The output device 15 is, e.g. a display or a printer, which outputs an image that is rendered by the CPU 11. The data bus 16 executes transmission/reception of data between respective blocks in the image processing computer 10.

Figure 2:
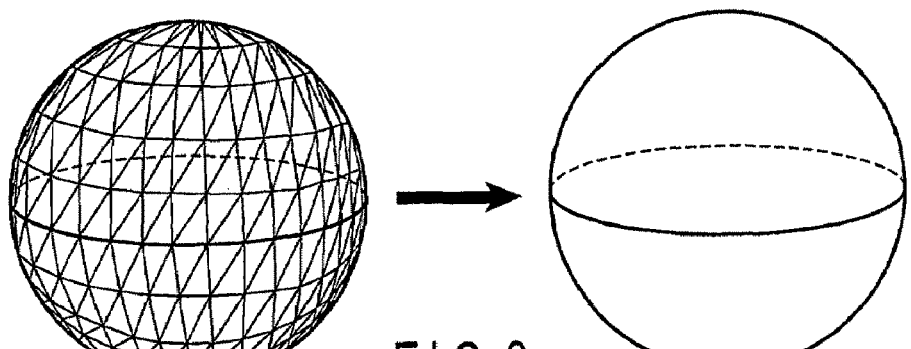
FIG. 2 illustrates an image processing method according to the first embodiment of the invention, and is a conceptual view showing an object represented by polygons ("polygonal object") and an object represented by an implicit function ("implicit object")

Next, the operation of the image processing computer 10 with the above configuration is described. The image processing computer 10 transforms a parametrically represented object, such as a polygonized object, to an implicit-function representation. FIG. 2 illustrates the scheme of this conversion. FIG. 2 schematically shows an object represented by polygons ("polygonal object") and an object represented by an implicit function ("implicit object"). Assume now that a spherical object is represented by triangular-shaped polygons, as shown in FIG. 2. The image processing computer 10 represents the spherical object using an implicit function.

The implicit-function representation is the following scheme. In a case where a surface $S \subset R^3$ of an object is given, the implicit-function representation of the surface S is a set $\{t, \phi(r\rightarrow)\}$, which meets $$r\rightarrow \in S \Leftrightarrow \phi(r\rightarrow)=t$$

where t is a given real value, and $\phi(r\rightarrow)$ is a real-valued function. In this case, $r\rightarrow \in R^3$ represents a position in a three-dimensional space. Without losing generality, t=0 may be set. Normally, the surface of an object is defined by $\phi(r\rightarrow)=0$. In the present embodiment, $\phi(r\rightarrow)$ is used not in the form of a function, but in the form of a surface position of an object. In this case, the surface position of the object is expressed using a signed minimum distance. The function using the signed minimum distance provides a value with a plus sign when a nearest point is present on the obverse side of a surface at a distance from a given point $r\rightarrow$ to the nearest point on the surface S, and provides a value with a minus sign when the nearest point is present on the reverse side of the surface. The signed minimum distance will be described later in greater detail.

Figure 3:
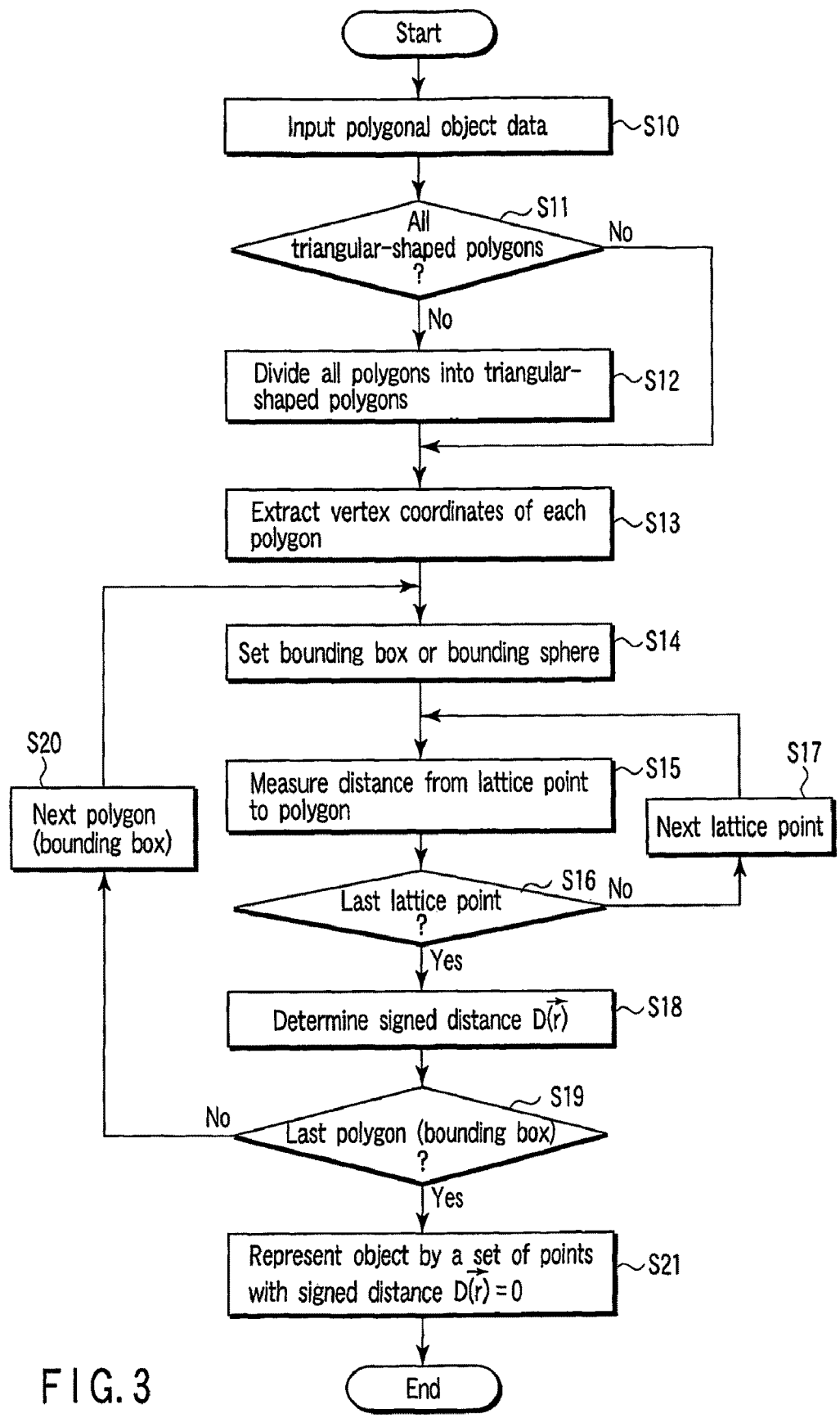
FIG. 3 is a flow chart relating to the image processing method and an image processing program according to the first embodiment of the invention.

A concrete method of transforming a polygonal representation to an implicit-function representation using the image processing computer 10 is described referring to FIG. 3. FIG. 3 is a flow chart illustrating a method of transforming a polygonal representation to an implicit-function representation using the image processing computer according to the present embodiment.

As is shown in FIG. 3, to start with, data on a polygonized object, or an polygonal object, is input through the input means 14 shown in FIG. 1 and stored, for example, in the memory 13 of the image processing computer 10 (step S10).

Then, the CPU 11 reads out the image process program 17 from the memory 13 and loads it in the main memory 12. The image process program 17 may be read out from a portable magnetic memory medium, instead of the memory 13. Further, the image process program 17 may be downloaded from a Web site via the Internet. At the same time, the CPU 11 reads out the object data (that is stored in step S10) from the memory 13 and loads it in the main memory 12. The CPU 11 executes an image process for the polygonal object according to the image process program 17 that is loaded in the main memory 12, thereby to transform the polygonal object to an implicit-function representation. A series of process steps of the image process are described below.

Figure 4:
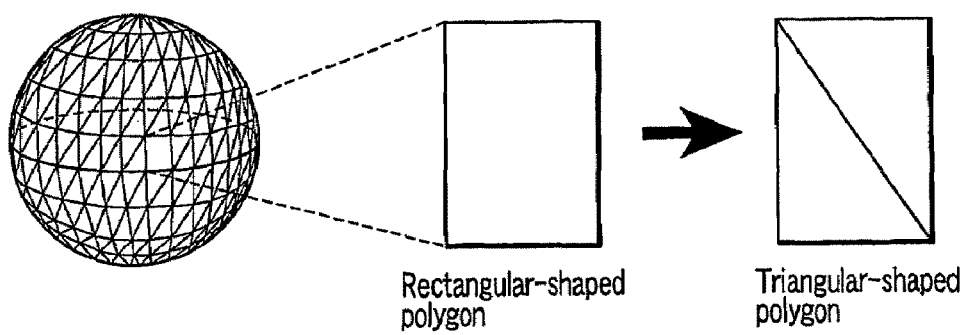
FIG. 4 is a conceptual view illustrating a step of decomposing a rectangular-shaped polygon into triangular-shaped polygons in the image processing method and the image processing program according to the first embodiment.

The CPU 11 confirms, based on the object data loaded in the main memory 12, whether all the polygons of the object surface are triangular-shape polygons (step S1). If there is a polygon with four or more angles (n-angular polygon; n>3), the CPU 11 divides the polygon into triangular-shaped polygons (step S12). FIG. 4 illustrates this process step. FIG. 4 illustrates a case where a rectangular-shaped polygon is present on the surface of a spherical object. The CPU 11 divides the rectangular-shaped polygon into two triangular-shaped polygons. Needless to say, the same process is executed in a case where a pentagonal-shaped polygon is included or in a case where a hexagonal-shaped polygon is included. In these cases, the polygons are divided into three triangular-shaped polygons and four triangular-shaped polygons, respectively. By the process in step S12, all the polygons that form the object surface are made into triangular-shaped polygons.

Next, the CPU 11 extracts vertex coordinates of each triangular-shaped polygon (step S13). FIG. 5 illustrates this process step. As shown in FIG. 5, assume that there is a triangular-shaped polygon TP having three vertices P1, P2 and P3 that are expressed by r1→, r2→ and r3→ from the origin O. The CPU 12 finds coordinates (x1, y1, z1), (x2, y2, z2) and (x3, y3, z3) of vertices P1, P2 and P3 in a three-dimensional space. This process is executed for all the triangular-shaped polygons that represent the object surface.

Subsequently, based on the vertex coordinates found in step S13, the CPU 11 generates a bounding box BB or a bounding sphere BS (step S14). FIG. 6 three-dimensionally shows an example of the bounding box BB. As is shown in FIG. 6, the bounding box BB refers to a space that surrounds one triangular-shaped polygon TP. When the bounding box BB or bounding sphere BS is generated, the CPU 11 generates lattice points that are arranged at regular intervals. In the case of the bounding box BB, it is conceptually assumed that lattice points LP define a space, i.e. a cube, that surrounds the triangular-shaped polygon. The lattice points LP are arranged at least at the corners of the cube. The bounding box BB or bounding sphere BS is generated as a set of the lattice points. FIG. 7 two-dimensionally shows an example of the bounding box BS. As shown in FIG. 7, a plurality of lattice points LP are arranged in a matrix in a three-dimensional space in which the triangular-shaped polygon TP is present. Since FIG. 7 depicts the space two-dimensionally, the triangular-shaped polygon can be viewed as a line segment.

Figure 8:
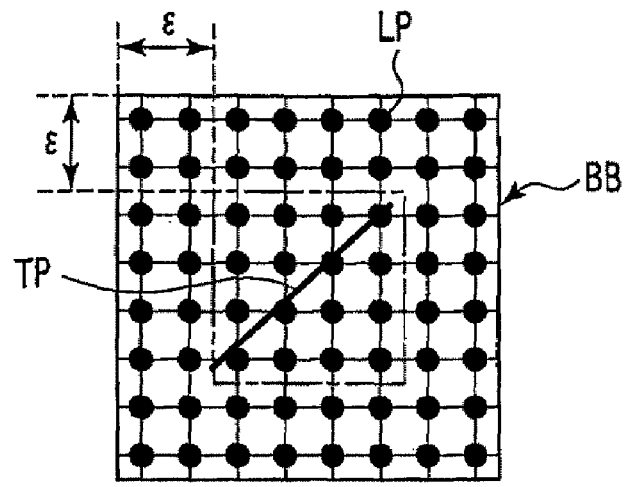
FIG. 8 is a two-dimensional conceptual view illustrating a step of generating the bounding box in the image processing method and the image processing program according to the first embodiment.
Figure 9:
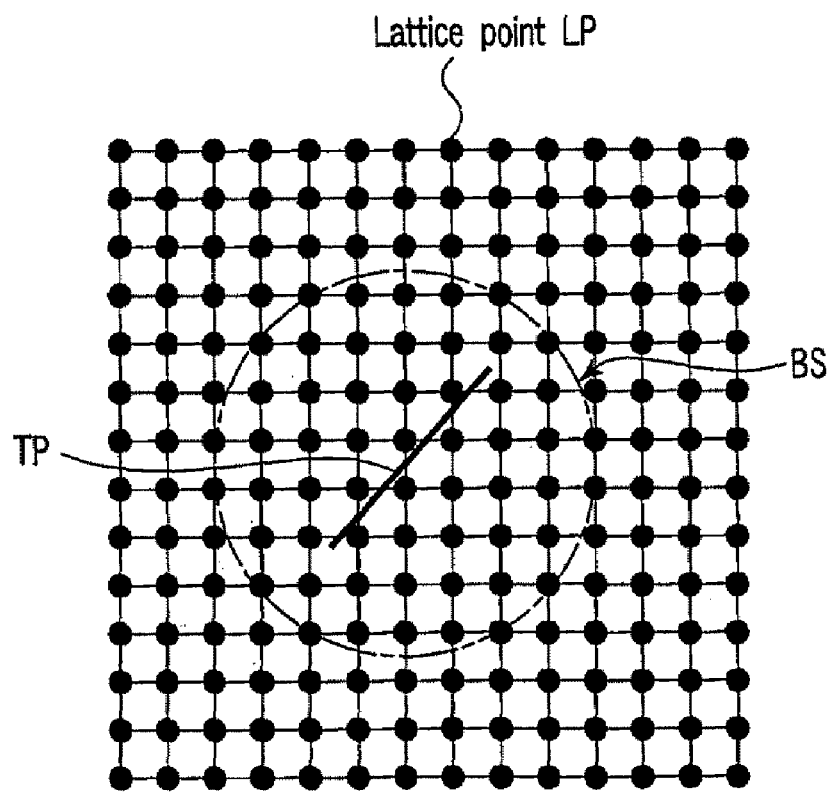
FIG. 9 is a two-dimensional conceptual view illustrating a step of generating a bounding sphere in the image processing method and the image processing program according to the first embodiment.

As is shown in FIG. 8, the bounding box BB is generated with a size that is greater than a size of the triangular-shaped polygon TP by a degree corresponding to some lattice points ($\epsilon$). FIG. 9 shows a case of the bounding sphere BS. Like the bounding box BB, the bounding sphere BB is generated so as to surround the triangular-shaped polygon TP with a size that is greater than the size of the triangular-shaped polygon TP by the degree ($\epsilon$). In the description below, the bounding box BB is described by way of example, but the same applies exactly to the case of the bounding sphere BS.

Figure 11:
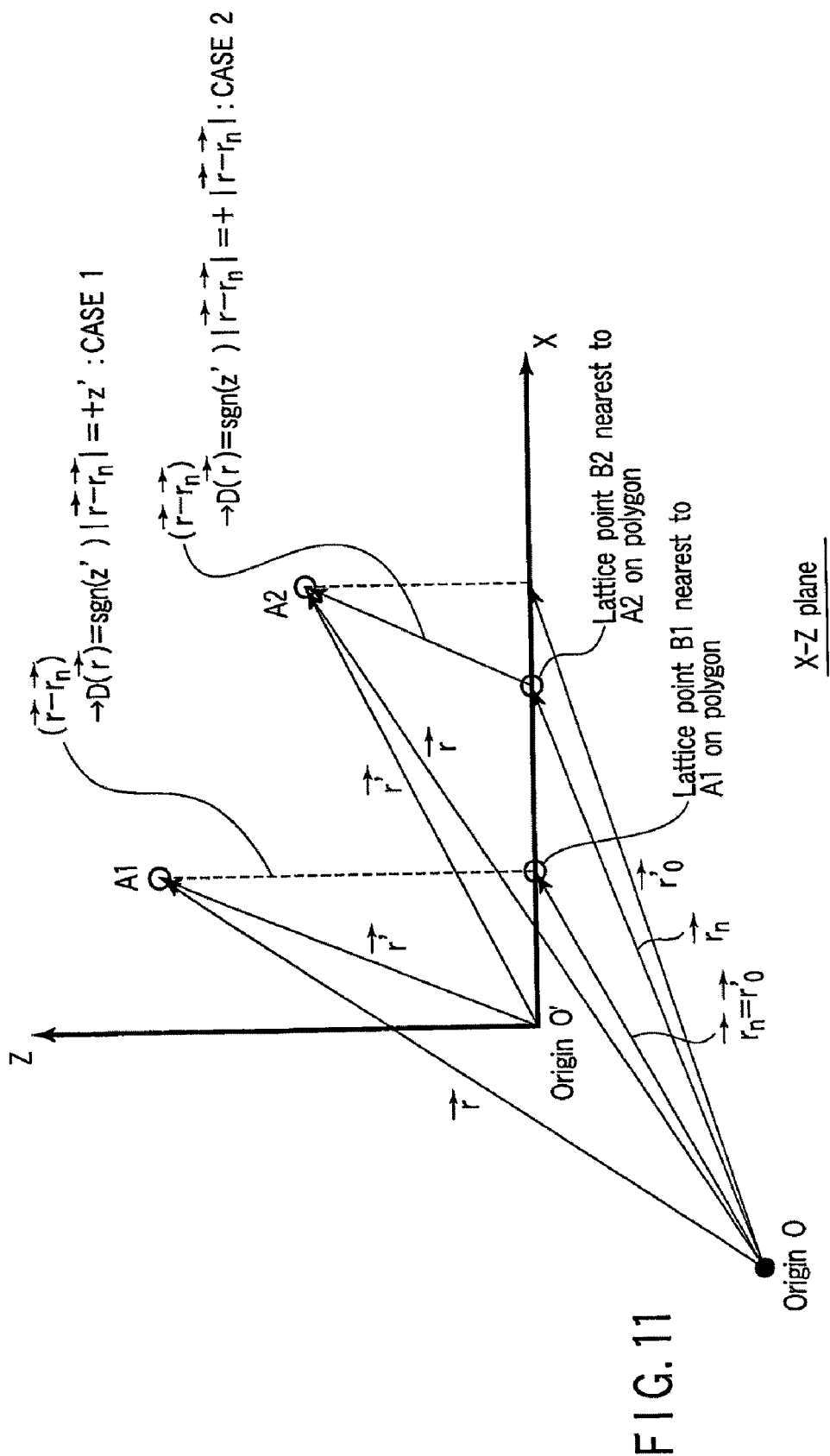
FIG. 11 is a two-dimensional conceptual view illustrating a step of finding the signed minimum distance in the image processing method and the image processing program according to the first embodiment.
Figure 12:
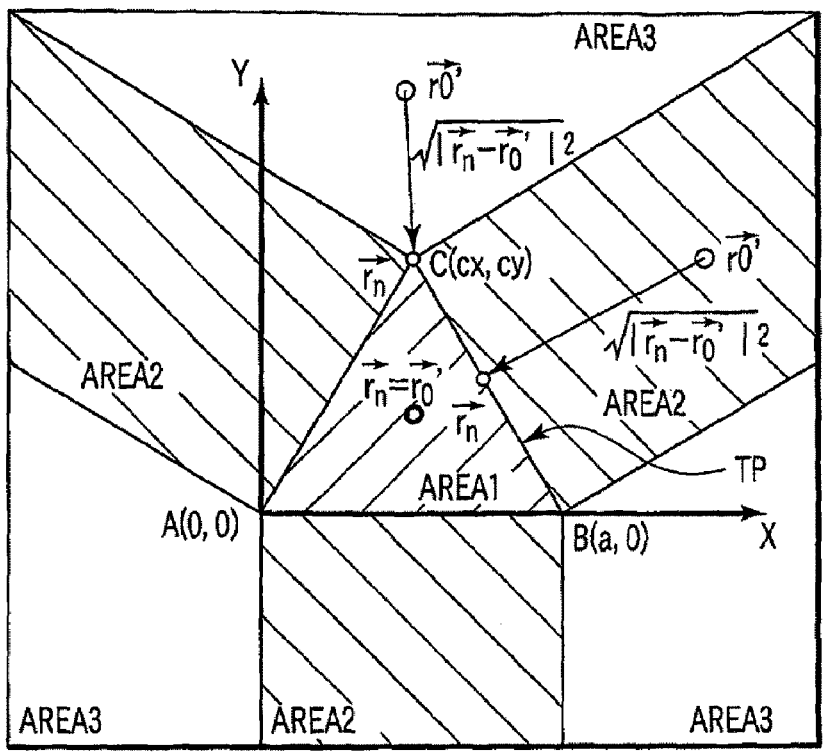
FIG. 12 is a two-dimensional conceptual view illustrating a step of finding the signed minimum distance in the image processing method and the image processing program according to the first embodiment.
Figure 13:
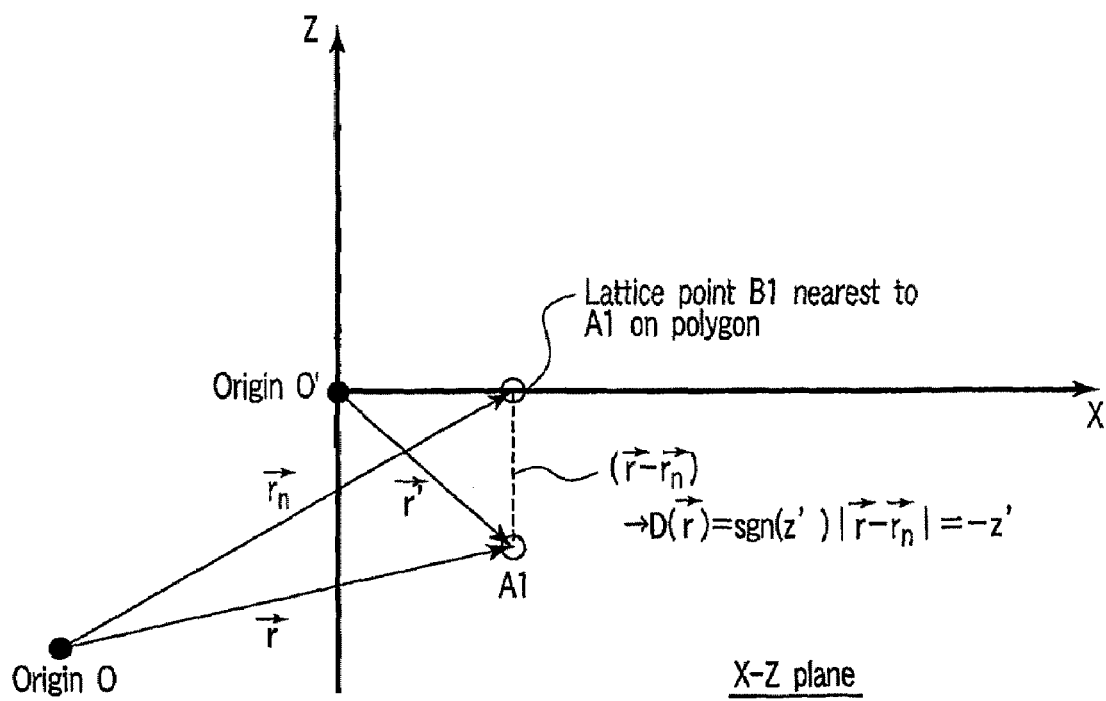
FIG. 13 is a two-dimensional conceptual view illustrating a step of finding the signed minimum distance in the image processing method and the image processing program according to the first embodiment.

Next, the CPU 11 measures a signed minimum distance from the lattice point LP included in the bounding box BB to the triangular-shaped polygon TP included in the bounding box BB (step S15). The method of measuring the signed minimum distance $D(r\rightarrow)$ is described referring to FIG. 10 to FIG. 13. FIG. 10 is a schematic diagram that three-dimensionally shows a plane including the plane of the triangular-shaped polygon TP. The plane including the plane of the triangular-shaped polygon TP is defined as an X-Y plane, and a normal vector to the X-Y plane is defined as a Z axis. FIG. 11 and FIG. 13 show X-Z planes, and FIG. 12 shows an X-Y plane. In FIG. 11 and FIG. 13, a direction extending from an intersection between the X axis and Z axis perpendicularly to the sheet surface of the drawings is a Y axis direction. In FIG. 12, a direction extending from an intersection between the X axis and Y axis perpendicularly to the sheet surface of the drawing is the Z axis direction.

As is shown in FIG. 10 and FIG. 11, when a lattice point A1 or A2 is arbitrarily given, this lattice point is set as $r\rightarrow=(x, y, z)$. The origin of $r\rightarrow$ is set as an origin O. A nearest point of $r\rightarrow$, which is present on the triangular-shaped polygon TP, is set as $r_n\rightarrow=(x_n, y_n, z_n)$. Then, as shown in FIG. 10, any one of the vertices of the triangular-shaped polygon TP is set as an origin O', and $r\rightarrow$ is transformed to $r'\rightarrow=(x', y', z')$ on a coordinate system having an X axis, which extends from the origin O' and corresponds to one of the sides of the triangular-shaped polygon TP, a Y axis, which is perpendicular to the X axis in the plane including the triangular-shaped polygon TP, and a Z axis that corresponds to the normal vector to the plane including the triangular-shaped polygon TP. Further, a projection point of $r'\rightarrow$ onto the X-Y plane is set as $r_0'\rightarrow=(x', y', 0)$. In the triangular-shaped polygon TP, a nearest lattice point from $r_0'\rightarrow$ becomes $r_n\rightarrow$. As is clear from FIG. 11, the absolute value of the distance from the arbitrary lattice point to the nearest lattice point is given by $|r\rightarrow-r_n\rightarrow|$. A signed minimum distance $D(r\rightarrow)$ is given by $sgn(z') |r\rightarrow-r_n\rightarrow|$. In this case, $sgn(z')$ is a function indicative of whether the value z' of the lattice point of interest is plus or minus on the XYZ coordinates.

Taking the lattice points A1 and A2 by way of example, a specific method of measuring the signed minimum distance $D(r\rightarrow)$ is explained. The case of the lattice point A1 is referred to as CASE 1, and the case of the lattice point A2 as CASE 2. CASE 1 is first described.

To begin with, the position $r\rightarrow$ of the lattice point A1 is transformed to $r'\rightarrow$ on the XYZ coordinate system. The lattice point A1 is projected onto the X-Y plane. The projection position is $r_0'\rightarrow=(x', y', 0)$. In CASE 1, as shown in FIG. 10 and FIG. 11, $r_0'\rightarrow$ is present within the plane of the triangular-shaped polygon TP. Thus, $r_0'\rightarrow=(x', y', 0)=r_n\rightarrow=(x_n, y_n, z_n)$, and the position $r'\rightarrow$ of the lattice point A1 coincides with the position $r_n\rightarrow$ of a nearest lattice point B1 on the X-coordinate and Y-coordinate. Thus, the signed minimum distance $D(r\rightarrow)$ at the lattice point A1 becomes $sgn(z') |r\rightarrow-r_n\rightarrow|=+z'$ (see FIG. 11).

Next, CASE 2 is described. Like CASE 1, the position $r\rightarrow$ of the lattice point A2 is transformed to $r'\rightarrow$ on the XYZ coordinate system. The lattice point A2 is projected onto the X-Y plane. The projection position is $r_0'\rightarrow=(x', y', 0)$. In CASE 2, as shown in FIG. 10 and FIG. 11, $r_0'\rightarrow$ is present outside the triangular-shaped polygon TP. Thus, the position $r_n\rightarrow=(x_n, y_n, z_n)$ of a nearest point B2 associated with the lattice point A2 is different from the projection position $r_0'\rightarrow=(x', y', 0)$ of the lattice point A2. The nearest point B2 is located at a point to which the projection point $r_0'\rightarrow$ is shifted perpendicular to one side of the triangular-shaped polygon TP (see FIG. 10). Thus, the signed minimum distance $D(r\rightarrow)$ at the lattice point A2 is $sgn(z')|r\rightarrow-r_n\rightarrow|=+|r\rightarrow-r_n\rightarrow|$ ($\neq z'$) (see FIG. 11).

As has been described above, in CASE 1, the nearest lattice point is present within the plane of the triangular-shaped polygon TP. On the other hand, in CASE 2, the nearest lattice point is present on the side of the triangular-shaped polygon TP. As regards this point, a description is given referring to FIG. 12. Taking into account the relationship between an arbitrary lattice point and a lattice point nearest to the arbitrary lattice point on the triangular-shaped polygon, the X-Y plane can be divided into three areas AREA1, AREA2 and AREA3, as shown in FIG. 12. The area AREA1 is an area within the plane of the triangular-shaped polygon TP. The area AREA2 is an area defined between two parallel straight lines that extend from the associated vertices of the triangular-shaped polygon TP perpendicularly to the associated sides thereof. The area AREA3 is an area other than the areas AREA1 and AREA2.

When an arbitrary lattice point is projected on the X-Y plane, if the projection position is present within the area AREA1, $r_0'\rightarrow=r_n\rightarrow$, and $r_n\rightarrow$ is present within the plane of the triangular-shaped polygon TP. This case corresponds to the above-described CASE 1.

If the projection position is present in the area AREA2, $r_0'\rightarrow\neq r_n\rightarrow$, and $r_n\rightarrow$ is present on the side of the triangular-shaped polygon TP. A displacement between $r_0'\rightarrow$ and $r_n\rightarrow$ in the X-Y plane is $(|r_n\rightarrow-r_0'\rightarrow|^2)^{1/2}$. This case corresponds to the above-described CASE 2.

Further, if the projection position is present in the area AREA3, $r_0'\rightarrow\neq r_n\rightarrow$, and $r_n\rightarrow$ is present at the vertex of the triangular-shaped polygon TP. A displacement between $r_0'\rightarrow$ and $r_n\rightarrow$ in the X-Y plane is $(|r_n\rightarrow-r_0'\rightarrow|^2)^{1/2}$.

In the example shown in FIG. 11 and FIG. 12, the Z-axis value of the lattice point A1, A2 is plus. In FIG. 13, the Z-axis value of the lattice point A1 is minus. In this case, $sgn(z')$ is minus. The plus/minus of the signed function $sgn(z')$ indicates whether the lattice point is present on the outside or on the inside of the triangular-shaped polygon TP. Specifically, if the $sgn(z')$ is plus, the lattice point A1 is present on the outside of the object surface represented by the triangular-shaped polygon TP. If the $sgn(z')$ is minus, the lattice point A1 is present on the inside of the object surface represented by the triangular-shaped polygon TP.

The process of step S15 is executed, as described above. The process of step S15 is repeated for all the lattice points LP that are included in the bounding box BB (step S16, S17). When the process of step S15 is completed for all lattice points LP, the signed minimum distance $D(r\rightarrow)$ associated with the bounding box BB is determined (step S18).

As has been described above, in steps S14 to S18, the signed minimum distance $D(r\rightarrow)$ associated with one triangular-shaped polygon TP is found. The CPU 11 repeats execution of the process of steps S14 to S18 for all the triangular-shaped polygons (steps S19, S20). If the process for all triangular-shaped polygons is completed, the CPU 11 renders the to-be-processed object on the basis of the signed minimum distance $D(r\rightarrow)$ associated with each triangular-shaped polygon (step S21).

The object is rendered as a set of points with the signed minimum distances $D(r\rightarrow)=0$. In step S15, the distance between each lattice point and the triangular-shaped polygon has been found. Thus, by overlapping the distances from the respective lattice points to the triangular-shaped polygon, the position of the surface of the triangular-shaped polygon can be found. In short, the set of points with the signed minimum distances $D(\vec{r})=0$ does meet the implicit function $\phi(\vec{r})=0$, and does become the solution of the implicit function that represents the surface S of the to-be-processed object. Hence, in the present embodiment, the implicit function $\phi(\vec{r})$ itself is not found, but the set of signed minimum distances $D(\vec{r}) \rightarrow 0$ is found, thereby substantially transforming the object to the implicit function $\phi(\vec{r})$.

As described above, the signed minimum distances $D(\vec{r})$ is found for each polygon. Consequently, there may be a case where the relation between adjacent polygons cannot be maintained by merely overlapping the signed minimum distances $D(\vec{r})$. FIG. 14 and FIG. 15 illustrate such a case. FIG. 14 and FIG. 15 are schematic views illustrating the state in which signed minimum distances $D(\vec{r})$ are found for adjacent triangular-shaped polygons TP1 and TP2. FIG. 14 is a three-dimensional schematic view, and FIG. 15 is a two-dimensional schematic view.

Assume, as shown in FIG. 14 and FIG. 15, that the two triangular-shaped polygons TP1 and TP2 are adjacent to each other at their vertices P1 and P2. However, as shown in FIG. 14, the signed minimum distances $D(\vec{r})$ associated with the triangular-shaped polygons TP1 and TP2 are found by different bounding boxes BB1 and BB2. As a result, as shown in FIG. 15, there is a possibility that the vertices P1 and P2 do not agree when the polygonal representation is transformed to the implicit-function representation. In this case, as shown in FIG. 16, the CPU 11 adjusts the positions of the object surface so that the vertices P1 and P2 may agree. In FIG. 15 and FIG. 16, hatched areas are the areas where the signed function sgn(z') is minus. If the two polygons TP1 and TP2 are made to agree, as shown in FIG. 16, the area where the signed function sgn(z') is minus is confined in the region surrounded by the two polygons TP1 and TP2. In other words, when the spherical object, for example, as shown in FIG. 2 is considered, the signed minimum distances $D(\vec{r})=0$ are set on the surface S of the spherical object, the area where the signed function sgn(z') is minus is confined in the area on the inside of the spherical object, and the area where the signed function sgn(z') is plus is present in the area on the outside of the spherical object.

Figure 17:
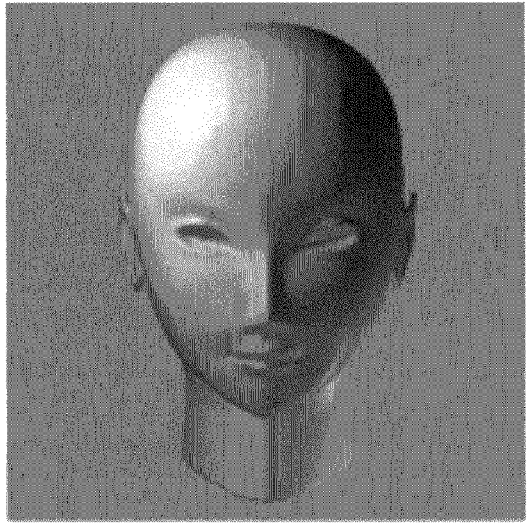
FIG. 17 is an image photograph of an object on a display, which is rendered by the image processing method and the image processing program according to the first embodiment.
Figure 19:
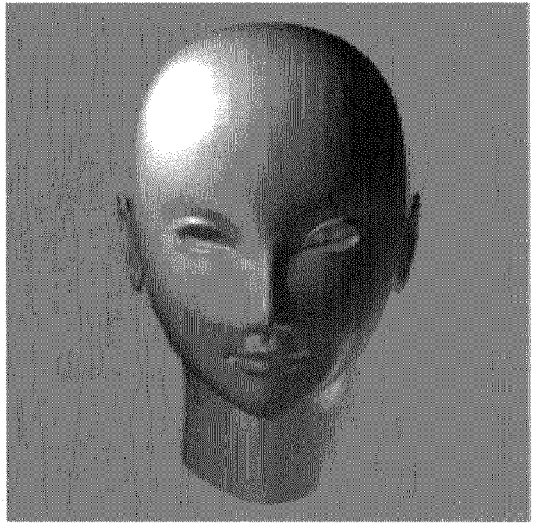
FIG. 19 is an image photograph of an object on a display, which is rendered by a prior-art polygonal representation.
Figure 18:
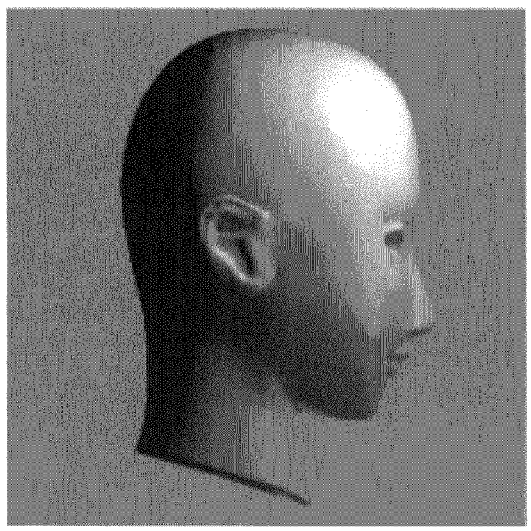
FIG. 18 is an image photograph of an object on the display, which is rendered by the image processing method and the image processing program according to the first embodiment.
Figure 20:
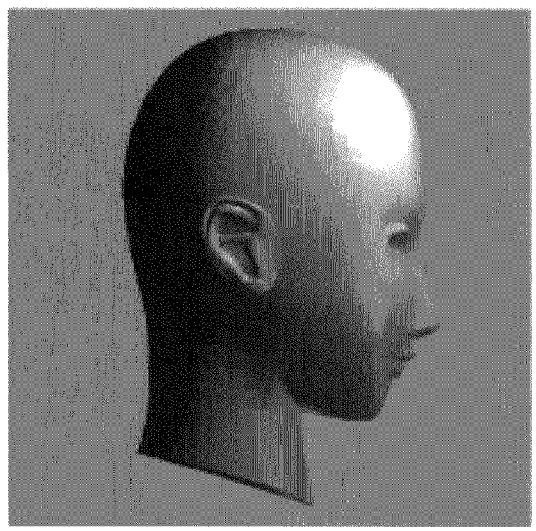
FIG. 20 is an image photograph of an object on the display, which is rendered by the prior-art polygonal representation.

By the above process, the polygonal object is transformed to the implicit-function representation, and the CPU 11 outputs the object, which is represented by the implicit function, through the output device 15. FIG. 17 and FIG. 18 show examples of objects that are represented by the implicit functions by the method described in the present embodiment. The transformation to the implicit function is performed using (90×90×90) bounding boxes. FIG. 19 and FIG. 20 show examples of objects that are obtained by polygonizing the objects shown in FIG. 17 and FIG. 18. Each of these polygonal objects is represented by 8754 vertices and 17504 surfaces. As is clear from the comparison between FIGS. 17 and 18 and FIGS. 19 and 20, the object surface is smoother and more natural in the implicit function representation of the present embodiment than in the polygonal representation.

Figure 21:
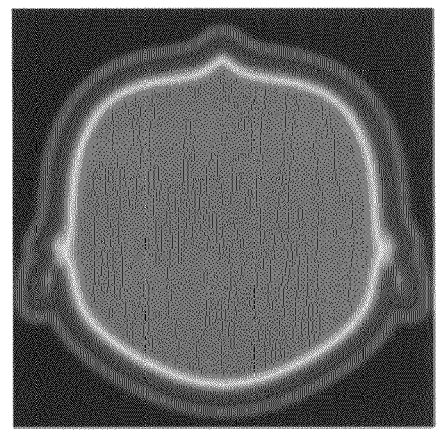
FIG. 21 is an image photograph of a cross section in an X-Y plane of an object on a display, which is rendered by the image processing method and the image processing program according to the first embodiment.
Figure 21:
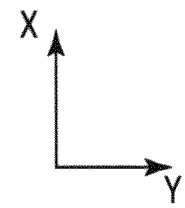
Figure 22:
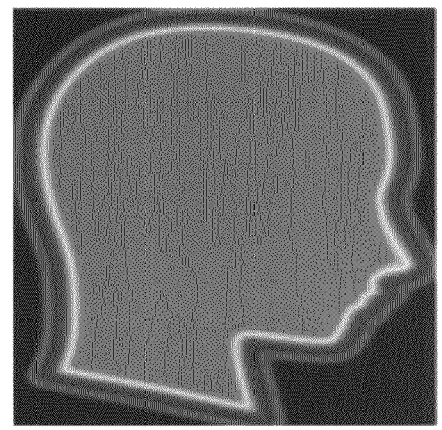
FIG. 22 is an image photograph of a cross section in an X-Z plane of the object on the display, which is rendered by the image processing method and the image processing program according to the first embodiment.
Figure 22:
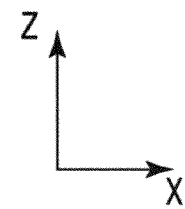
Figure 23:
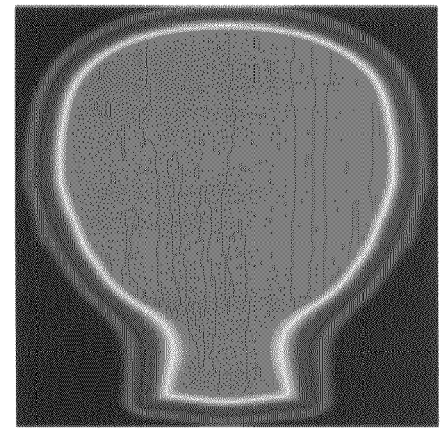
FIG. 23 is an image photograph of a cross section in a Y-Z plane of the object on the display, which is rendered by the image processing method and the image processing program according to the first embodiment.
Figure 23:
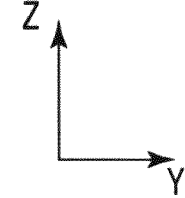

FIG. 21 through FIG. 23 are an X-Y cross section, an X-Z cross section and a Y-Z cross section of the object shown in FIG. 17 and FIG. 18. In the Figures, an area colored in red is an area where the signed function sgn(z') is minus, an area colored in blue is an area where the signed function sgn(z') is plus, and an area colored in green is an area where the signed function sgn(z') is nearly zero. As shown in the Figures, the area with the minus-signed function sgn(z') is confined inside the object, and the area with the plus-signed function sgn(z') is present on the outside of the object. In this manner, a surface which has, in fact, no thickness may be made to have a thickness, and thus a phenomenon that occurs near the object surface may be treated in a simplified manner.

The following advantageous effects (1) and (2) can be obtained by the image processing method, image processing program product and image processing computer according to the present embodiment.

(1) An implicit-function representation method with high versatility in use can be obtained.

In the method of this embodiment, the signed distance function $D(\vec{r})$ is found for each of individual triangular-shaped polygons TP. Using a set of points with $D(\vec{r})=0$, the object is represented by the implicit function $\phi(\vec{r})$. Accordingly, regardless of the shape of the object to be rendered, the polygonal representation can be transformed to the implicit-function representation. In other words, no matter how complex the shape of the object is, the implicit-function representation method with high versatility in use can be provided.

In addition, since the implicit-function representation can be used with high versatility, animation with more reality can be created in various fields, compared to the polygonal representation.

(2) Determination of collision of objects can be simplified.

The implicit-function representation according to this embodiment uses the signed distance function. The signed function sgn(z') is minus on the inside of the object to be rendered, and it is plus on the outside of the object. Thus, determination of collision between two objects is very simple. For example, if an object B collides with an object A, the surface of the object B contacts the object A, or a part of the surface of the object B is present inside the object A. This can easily be determined by paying attention to the signed function sgn(z') relating to the surface of the object B. Therefore, computer games, such as racing games or fighting games, that includes more complex objects, can be enjoyed.

Next, a description is given of an image processing method, an image processing program product and an image processing computer according to a second embodiment of the invention. In this second embodiment, bounding boxes are set more finely in a region including an object outline part than in the first embodiment.

Figure 24:
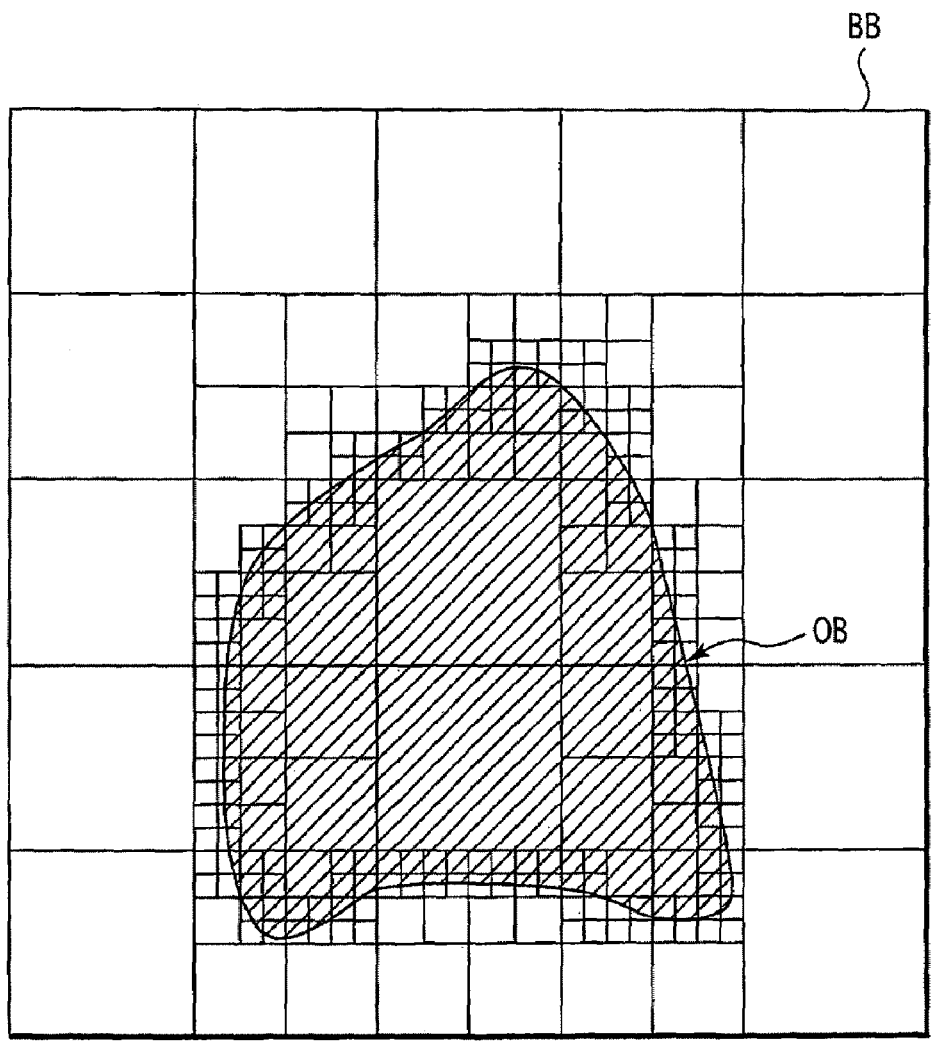
FIG. 24 is a two-dimensional conceptual view illustrating a state in which a bounding box is generated in an image processing method and an image processing program according to a second embodiment of the invention.

FIG. 24 is a schematic diagram that two-dimensionally illustrates a state in which bounding boxes BB are generated with respect to a polygonal object OB. Squares in FIG. 24 are bounding boxes BB. As is shown in FIG. 24, in the present embodiment, the size of the bounding box is adjusted on a location-by-location basis. In particular, the size of the bounding box is decreased at an outline part of the object OB to be treated, and a greater number of bounding boxes BB are generated.

Figure 25:
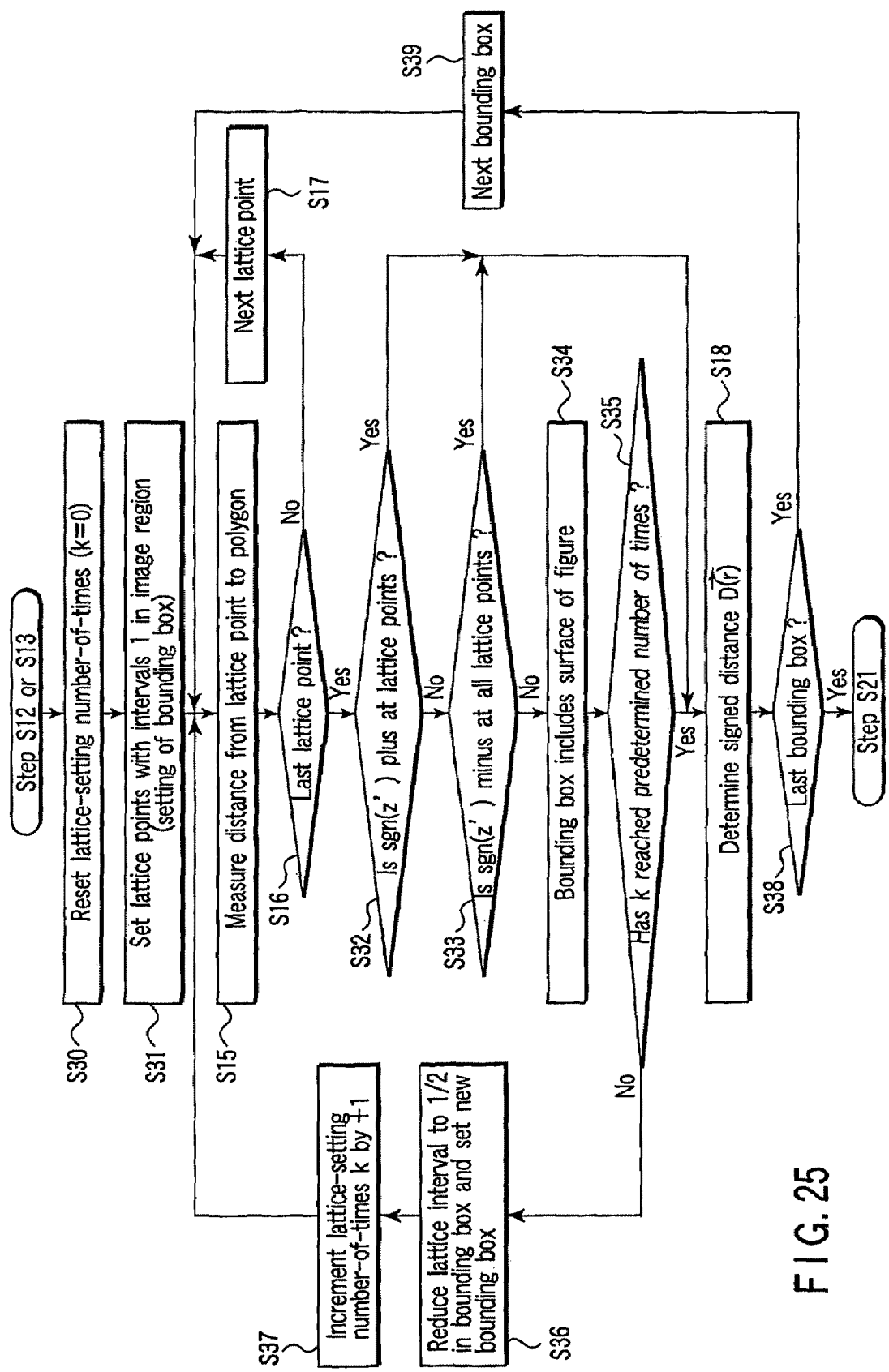
FIG. 25 is a flow chart relating to the image processing method and the image processing program according to the second embodiment of the invention.
Figure 26:
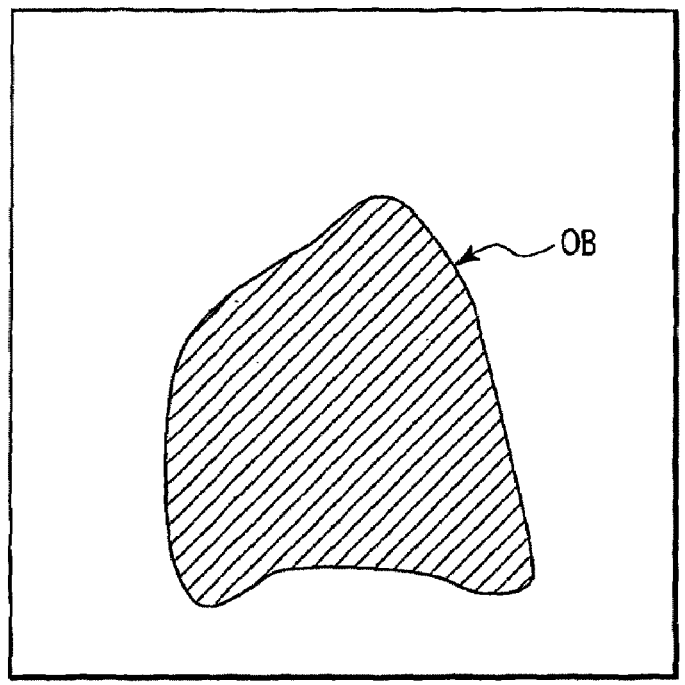
FIG. 26 is a two-dimensional conceptual view showing an object that is transformed from a polygonal representation to an implicit-function representation by the image processing method and the image processing program according to the second embodiment.

Referring to a flow chart of FIG. 25, how to find a signed minimum distance $D(\vec{r})$ in this embodiment is described. The image processing computer according to the present embodiment has the same structure as that of the first embodiment, so a description thereof is omitted. To start with, the process up to step S11 or S12 described in connection with the first embodiment is executed, and all the polygons included in the to-be-treated object OB are divided into triangular-shaped polygons. Assume that the to-be-treated object OB has a shape as shown in, e.g. FIG. 26. FIG. 26 two-dimensionally shows the object OB.

Subsequently, according to the image process program 17 that is loaded into the main memory 12, the CPU 11 resets a lattice-setting number-of-times k (step S30). The lattice-setting number-of-times k is a numerical value indicating how finely the bounding box is to be divided, as will be described later in detail. The upper limit value of the lattice-setting number-of-times k is preset, and the CPU 11 causes the main memory 12 to store the lattice-setting number-of-times k and the upper limit value thereof.

Figure 27:
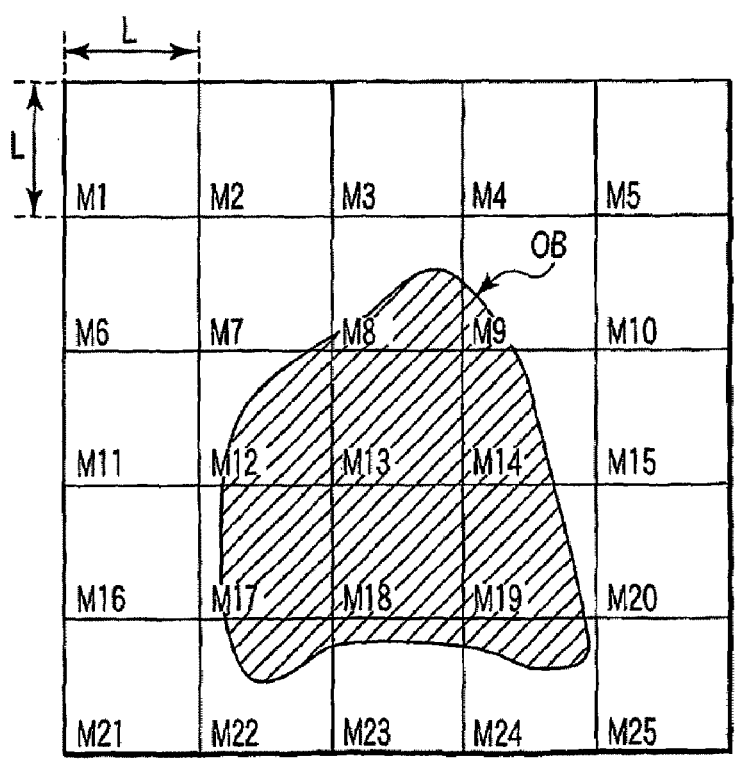
FIG. 27 is a two-dimensional conceptual view illustrating a step of generating a bounding box in the image processing method and the image processing program according to the second embodiment.

As is shown in FIG. 27, the CPU 11 divides a region, which includes the object OB, into a plurality of meshes M1 to M25. Each mesh is a cube having a length L on each side. A bounding box BB is generated for each mesh (step S31). Lattice points included in the bounding box BB may be those as described in the first embodiment, or may be generated only at the eight vertices of the cube. FIG. 27, too, two-dimensionally shows the object OB. If the region that includes the to-be-treated object OB is a cube, cubes are arranged in five columns in a direction perpendicular to the sheet surface of FIG. 27. The total number of generated bounding boxes BB is (25×5 columns)=125. For the purpose of simple description, in the following descriptions, attention is paid to only 25 meshes M1 to M25 that appear in the two-dimensional space.

The CPU 11 successively finds the signed minimum distance $D(r\rightarrow)$ from a lattice point to a triangular-shaped polygon with respect to the bounding boxes BB corresponding to the meshes M1 to M25 (steps S15 to S17). How to find the signed minimum distance $D(r\rightarrow)$ has been described in connection with the first embodiment, so a description thereof is omitted here.

If the signed minimum distances $D(r\rightarrow)$ associated with all lattice points in an arbitrary bounding box BB (step S16), the CPU 11 discriminates whether the signed functions sgn(z') associated with all lattice points are plus or not (step S32). If all signed functions sgn(z') are plus, the signed minimum distances $D(r\rightarrow)$ in this bounding box BB are determined. For the next bounding box BB (step S39), the process of steps S15 to S17 is executed. If it is discriminated in step S32 that all signed functions sgn(z') are not plus, the CPU 11 then discriminates whether all the signed functions sgn(z') are minus or not (step S33). If all the signed functions sgn(z') are minus, the signed minimum distances $D(r\rightarrow)$ in the bounding box BB are determined. For the next bounding box BB (step S39), the process of steps S15 to S17 is executed. In the example shown in FIG. 27, if the process starts with the mesh M1, the signed minimum distances $D(r\rightarrow)$ for the meshes M1 to M6 are determined by the above process.

Figure 28:
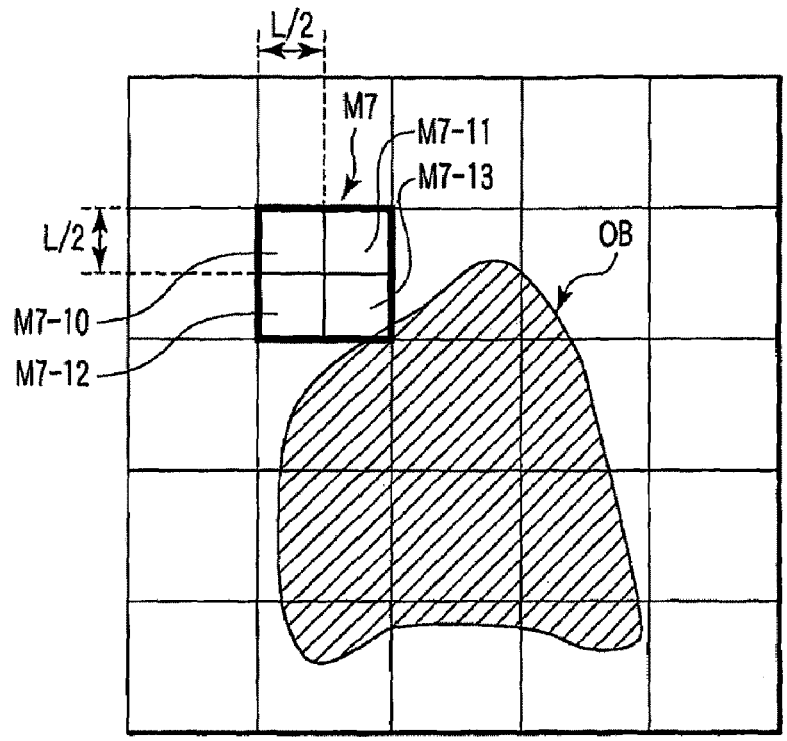
FIG. 28 is a two-dimensional conceptual view illustrating a step of dividing a bounding box in the image processing method and the image processing program according to the second embodiment.

If it is determined in step S33 that all the signed functions sgn(z') are not minus, that is, if the bounding box BB includes lattice points with plus-signed functions sgn(z') and lattice points with minus-signed functions sgn(z'), the bounding box BB includes an outline part of the object (step S34). In the example of FIG. 27, this case first occurs with respect to the bounding box BB associated with the mesh M7. Then, the CPU 11 compares the lattice-setting number-of-times k with the upper limit value thereof that is stored in the main memory 12 (step S18). If the upper limit value is reached, the latest found values are determined as the signed minimum distances $D(r\rightarrow)$ (step S18). If the upper limit value is not reached, the CPU 11 divides the mesh corresponding to this bounding box BB into finer meshes each having a ½ side dimension (step S36). FIG. 28 illustrates this process step. FIG. 28 illustrates the process of step S36 for the mesh M7. The mesh M7 is divided into meshes M7-10 to M7-13 each having an L/2 side dimension. The CPU 11 generates bounding boxes BB in association with the meshes M7-10 to M7-13 (step S36), and increments the lattice-setting number-of-times k by +1. The lattice-setting number-of-times k indicates the number of times of re-division of a mesh, and the upper limit value of the lattice-setting number-of-times k determines how finely the mesh is set. In this description, it is assumed that the upper limit value is 3.

Figure 29:
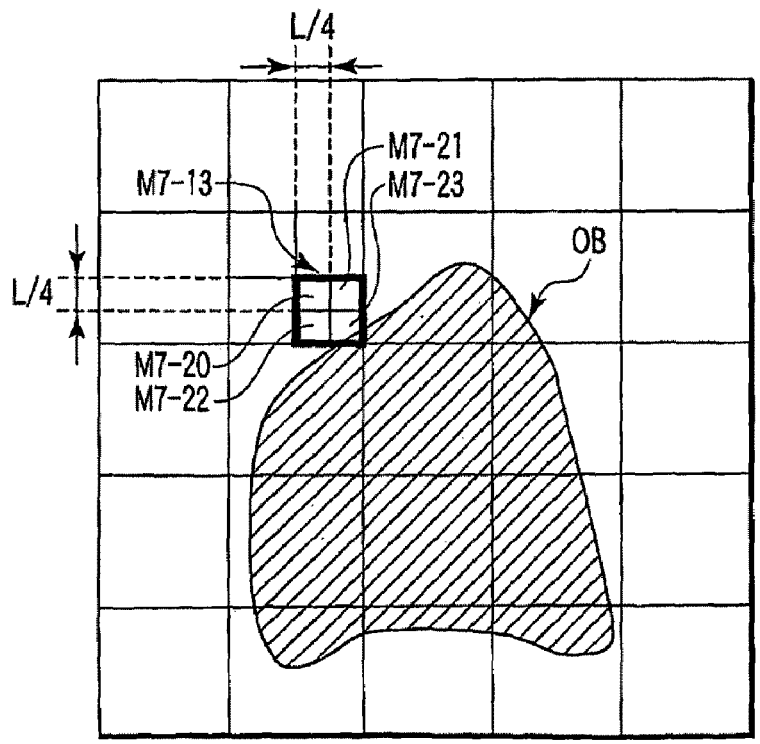
FIG. 29 is a two-dimensional conceptual view illustrating a step of dividing a bounding box in the image processing method and the image processing program according to the second embodiment.

The CPU 11 repeats the process of steps S15 to S35 for the bounding boxes BB associated with the meshes M7-10 to M7-13, into which the mesh M7 is divided. As shown in FIG. 28, an outline part of the object OB is included in only the mesh M7-13 in the mesh M7. Accordingly, all the signed functions sgn(z') of the lattice points in the bounding boxes BB corresponding to the meshes M7-10 to M7-12 are plus (step S32), and thus the signed minimum distances $D(r\rightarrow)$ for these bounding boxes BB are determined (step S18). On the other hand, the bounding box BB corresponding to the mesh M7-13 includes both lattice points with plus-signed functions sgn(z') and minus-signed functions sgn(z') (step S32, S33). Thus, the CPU 11 re-divides the mesh M7-13 into meshes M7-20 to M7-23 each having an L/4 side dimension, and generates bounding boxes BB corresponding to these meshes M7-20 to M7-23 (step S36). FIG. 29 illustrates this process. The lattice-setting number-of-times k is incremented to k=2 (step S37).

Figure 30:
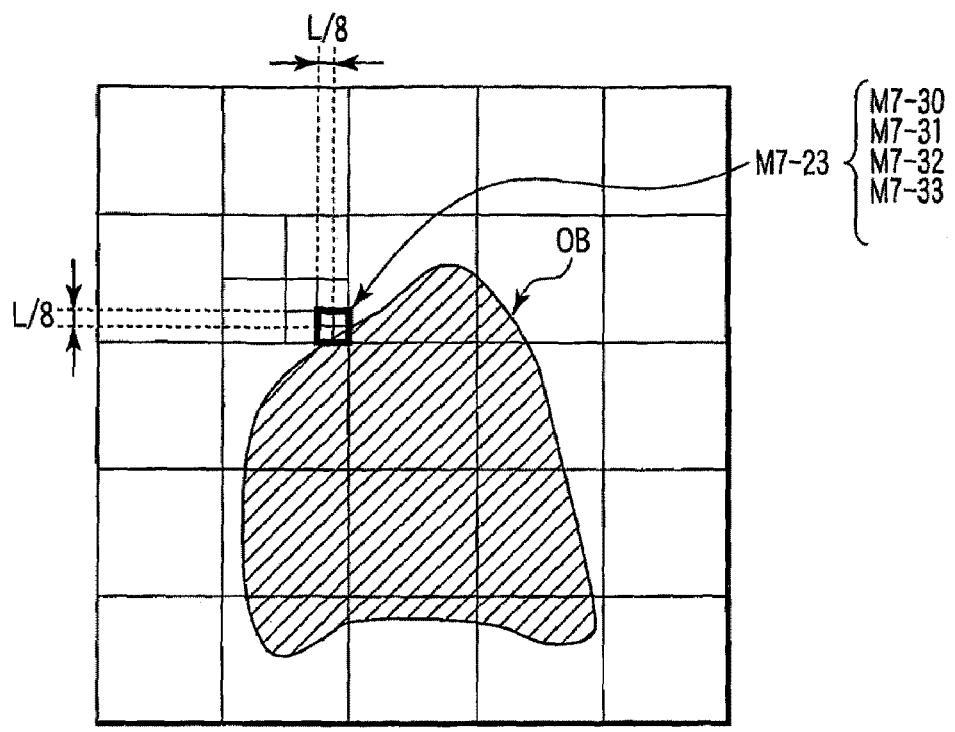
FIG. 30 is a two-dimensional conceptual view illustrating a step of dividing a bounding box in the image processing method and the image processing program according to the second embodiment.

Then, the CPU 11 repeats the process of steps S15 to S35 for the bounding boxes BB associated with the meshes M7-20 to M7-23, into which the mesh M7-13 is re-divided. As shown in FIG. 29, an outline part of the object OB is included in only the mesh M7-23 in the mesh M7-13. Accordingly, all the signed functions sgn(z') of the lattice points in the bounding boxes. BB corresponding to the meshes M7-20 to M7-22 are plus (step S32), and thus the signed minimum distances $D(r\rightarrow)$ for these bounding boxes BB are determined (step S18). On the other hand, the bounding box BB corresponding to the mesh M7-23 includes both lattice points with plus-signed functions sgn(z') and minus-signed functions sgn(z') (step-S32, S33). Thus, the CPU 11 re-divides the mesh M7-23 into meshes M7-30 to M7-33 each having an L/8 side dimension, and generates bounding boxes BB corresponding to these meshes M7-30 to M7-33 (step S36). FIG. 30 illustrates this process. The lattice-setting number-of-times k is incremented to k=3 (step S37).

Subsequently, the CPU 11 repeats the process of steps S15 to S35 for the bounding boxes BB associated with the meshes M7-30 to M7-33, into which the mesh M7-23 is re-divided. As shown in FIG. 30, an outline part of the object OB is included in only the mesh M7-33 in the mesh M7-23. Accordingly, all the signed functions sgn(z') of the lattice points in the bounding boxes BB corresponding to the meshes M7-30 to M7-32 are plus (step S32), and thus the signed minimum distances $D(r\rightarrow)$ for these bounding boxes BB are determined (step S18). On the other hand, the bounding box BB corresponding to the mesh M7-33 includes both lattice points with plus-signed functions sgn(z') and minus-signed functions sgn (z') (step S32, S33). In this case, however, the lattice-setting number-of-times k already reaches the upper limit value of k=3 (step S35). Thus, the CPU 11 also determines the signed minimum distances $D(r\rightarrow)$ for the bounding box BB corresponding to the mesh M7-33 (step S18).

Figure 31:
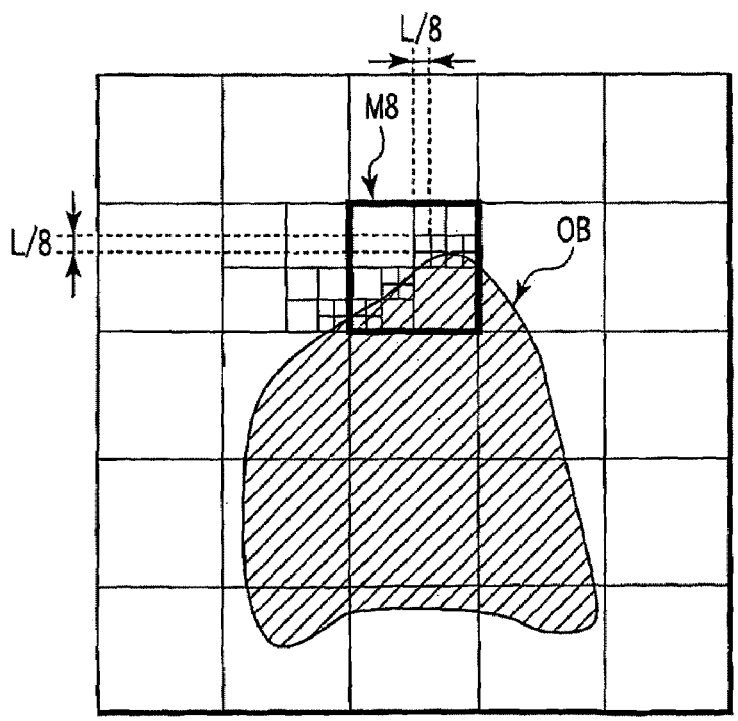
FIG. 31 is a two-dimensional conceptual view illustrating a step of dividing a bounding box in the image processing method and the image processing program according to the second embodiment.

The process for the mesh M7 is thus completed, and the CPU 11 executes the process of steps S15 to S37 for the bounding box BB corresponding to the mesh M8 (step S38, S39). Since the mesh M8, too, includes an outline part of the object OB, the CPU 11 repeats, like the case of the mesh M7, re-division of associated divided meshes until the lattice-setting number-of-times k reaches the upper limit value. Thereby, the CPU 11 determines the signed minimum distances $D(r\rightarrow)$. FIG. 31 illustrates this process.

Subsequently, similar processes are repeated for the meshes M9 to M25. As is shown in FIG. 27, all the signed functions sgn(z') of the lattice points in the bounding boxes BB corresponding to the meshes M10, M11, M15, M16, M20, M21 and M25 are plus (step S32), and thus the signed minimum distances $D(r\rightarrow)$ are determined without re-division of meshes. This is because these meshes are present on the outside of the object OB to be treated. On the other hand, since all the signed functions sgn(z') of the lattice points in the bounding boxes BB corresponding to the meshes M13 and M18 are minus (step S33), the signed minimum distances $D(r\rightarrow)$ are also determined without re-division of meshes. By contrast, these meshes are present on the inside of the object OB. The bounding boxes BB corresponding to the meshes M9, M12, M14, M17, M19, M22, M23 and M24 include outline parts of the object OB. Accordingly, like the meshes M7 and M8, the re-division of meshes is repeated to determine the signed minimum distances $D(r\rightarrow)$.

After the signed minimum distances $D(r\rightarrow)$ for all the bounding boxes BB are found (step S38), the process of step S21, which has been described in connection with the first embodiment, is executed, and the to-be-treated object OB is rendered by the implicit-function representation.

The following advantageous effect (3) can be obtained by the image processing method, image processing program product and image processing computer according to the present embodiment, in addition to the advantageous effects (1) and (2) that have been described in connection with the first embodiment:

(3) The object can be represented more precisely, while the amount of computations can be reduced.

According to this embodiment, the size of the bounding box is varied on a location-by-location basis. In other words, whether the bounding box includes an object outline or not is determined on the basis of the signed function sgn(z'). As regards the region including an outline part of the object, the signed minimum distances $D(r\rightarrow)$ are found from many lattice points using a plurality of small bounding boxes. On the other hand, as regards the region including no outline part of the object, the signed minimum distances $D(r\rightarrow)$ are found from a small number of lattice points using a large bounding box. In order to render the to-be-treated object by the implicit-function representation, it should suffice if the positions on the surface thereof are recognized. Thus, even if the number of lattice points associated with the region including no outline part is reduced, the precision of the object surface is not adversely affected.

By greatly reducing the number of lattice points associated with the region including no outline part, the amount of computations in the CPU 11 can be reduced. At the same time, by increasing the number of lattice points associated with the region including an outline part, the to-be-treated object can be represented with higher precision.

Figure 32:
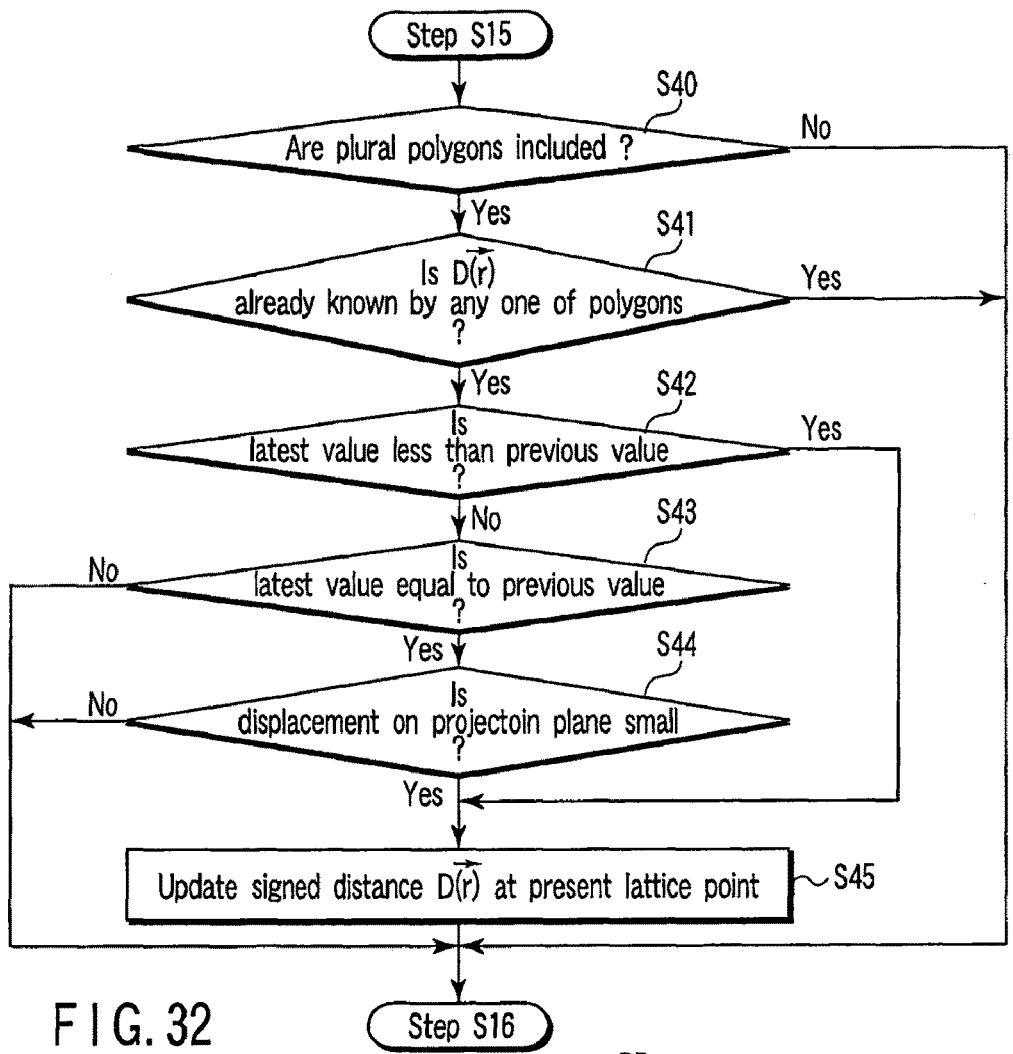
FIG. 32 is a flow chart relating to a image processing method and a image processing program according to a third embodiment of the invention.

Next, referring to FIG. 32, a description is given of an image processing method, an image processing program product and an image processing computer according to a third embodiment of the invention. The third embodiment relates to such a case that a plurality of triangular-shaped polygons are included in one bounding box in the first embodiment and the second embodiment. FIG. 32 is a flow chart illustrating a part of an image process method according to this embodiment.

Figure 33:
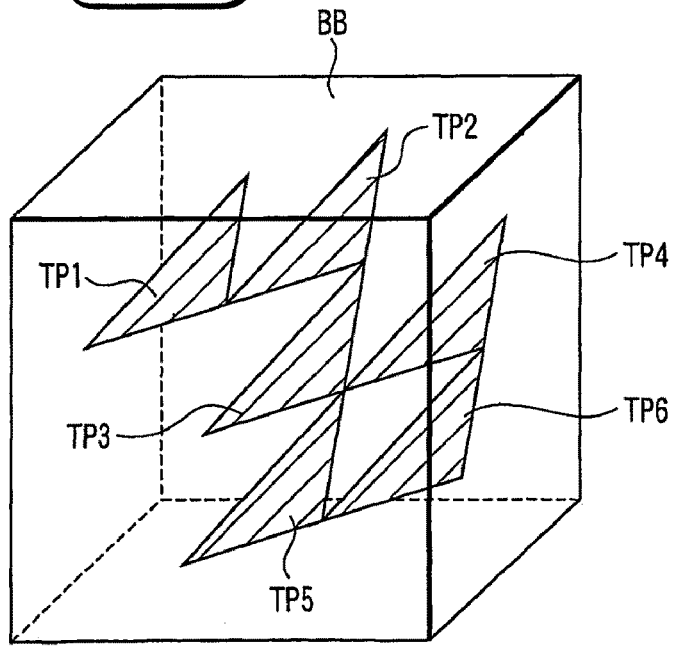
FIG. 33 is a three-dimensional conceptual view showing a bounding box that is generated by the image processing method and image processing program according to the third embodiment, illustrating a state in which a plurality of polygons are included in one bounding box.

As is shown in FIG. 32, the process up to step S15 is executed by the method that has been described in connection with the first and second embodiments. Thereby, the signed minimum distance $D(r\rightarrow)$ from any one of lattice points to a triangular-shaped polygon is found. Subsequently, it is determined whether a plurality of triangular-shaped polygons TP are included in the associated bounding box BB (step S40). FIG. 33 shows an example in which six triangular-shaped polygons TP1 to TP6 are included in one bounding box BB.

If only one triangular-shaped polygon TP is included in the bounding box BB, the process goes to step S16. That is, the CPU 11 executes the same process as in the first embodiment. On the other hand, if a plurality of triangular-shaped polygons TP1 to TP6 are included in the bounding box BB, as shown in FIG. 33, the CPU 11 confirms whether the signed minimum distance $D(r\rightarrow)$ associated with the present lattice point is already found by a triangular-shaped polygon (e.g. TP2-TP6) that is other than a triangular-shaped polygon (e.g. TP1) that is currently of interest (step S41). If the signed minimum distance $D(r\rightarrow)$ is not yet found by the other triangular-shaped polygons TP2 to TP6, the control advances to step S16 and the process for the next lattice point is executed.

If the signed minimum distance $D(r\rightarrow)$ is already found by the other triangular-shaped polygons TP2 to TP6 (the value in this case is referred to as "previous value"), the CPU 11 compares a latest signed minimum distance $D(r\rightarrow)$ found in association with the present triangular-shaped polygon TP1 (this value is referred to as "latest value") with the previous value (step S42). The latest value is less than the previous value, the CPU 11 discards the previous value and updates the signed minimum distance $D(r\rightarrow)$ associated with the present lattice point with the latest value. The CPU 11 then goes to step S16.

If the latest value is not less than the previous value (step S42), the CPU 11 determines whether the latest value is equal to the previous value (step S43). If both are not equal, that is, if the latest value is greater than the previous value, the CPU 11 advances to step S16 without updating the signed minimum distance $D(r\rightarrow)$. In this case, the latest value is discarded. If the latest value is equal to the previous value in step S43, the CPU 11 confirms a displacement of a projection point on the X-Y plane (step S44).

The step S44 is explained by taking, as an example, a case where the signed minimum distance $D(r\rightarrow)$ of the triangular-shaped polygon TP1 is already known when the distance $D(r\rightarrow)$ of the triangular-shaped polygon TP2 is to be found in connection with the bounding box BB shown in FIG. 33. If the signed minimum distance $D(r\rightarrow)$ associated with the present lattice point is equal between the triangular-shaped polygons TP1 and TP2, a displacement between the projection point on the X-Y plane and the nearest lattice point is compared with respect to each of the triangular-shaped polygons TP1 and TP2. As shown in FIG. 34, as regards the triangular-shaped polygon TP1 with the already known signed minimum distance $D(r\rightarrow)$, a projection point vector from the lattice point LP, which is currently of interest, onto the X-Y coordinates is set as $r_{o1}'\rightarrow$, and the nearest point vector is set as $r_{n1}\rightarrow$. In this case, a displacement between $r_{o1}'\rightarrow$ and $r_{n1}\rightarrow$, i.e. a distance d1 therebetween, is $(|r_{n1}\rightarrow - r_{o1}'\rightarrow|^2)^{1/2}$.

On the other hand, as shown in FIG. 35, as regards the triangular-shaped polygon TP2 that is currently of interest, a projection point vector from the lattice point LP onto the X-Y coordinates is set as $r_{o2}'\rightarrow$, and the nearest point vector is set as $r_{n2}\rightarrow$. In this case, a displacement between $r_{o2}'\rightarrow$ and $r_{n2}\rightarrow$, i.e. a distance d2 therebetween, is $(|r_{n2}\rightarrow - r_{o2}'\rightarrow|^2)^{1/2}$.

Assume now that d2<d1. That is, consider that the displacement on the X-Y coordinates is less in connection with the triangular-shaped polygon TP2 that is currently of interest than in connection with the triangular-shaped polygon TP1 with the known $D(r\rightarrow)$. In this case, the CPU 11 updates the signed minimum distance $D(r\rightarrow)$ associated with the lattice point with the latest value found in connection with the triangular-shaped polygon TP2 (step S45). Then, the CPU 11 advances to the process of step S16. On the other hand, if d2>d1, the latest value is discarded and the signed minimum distance $D(r\rightarrow)$ is not updated. The CPU 11 then goes to the process of step S16.

The following advantageous effect (4) can be obtained by the present embodiment, in addition to the advantageous effects (1) to (3) that have been described in connection with the first and second embodiments:

(4) The object can be represented with still higher precision.

In the method according to the present embodiment, in a case where a position of an object surface is given by a plurality of polygons, the surface is represented by the implicit function using the less signed minimum distance $D(r\rightarrow)$. If the signed minimum distance $D(r\rightarrow)$ is equal between the plural polygons, the signed minimum distance $D(r\rightarrow)$ with a less displacement from the projection point on the X-Y plane to the triangular-shaped polygon is used. Therefore, the object surface can be represented with higher accuracy.

The present embodiment is particularly effective in connection with the second embodiment. In the first embodiment, a bounding box is generated for each of polygons. In the second embodiment, a bounding box is generated for each of predetermined regions, and so it is highly possible that a plurality of polygons are included in one bounding box.

Figure 36:
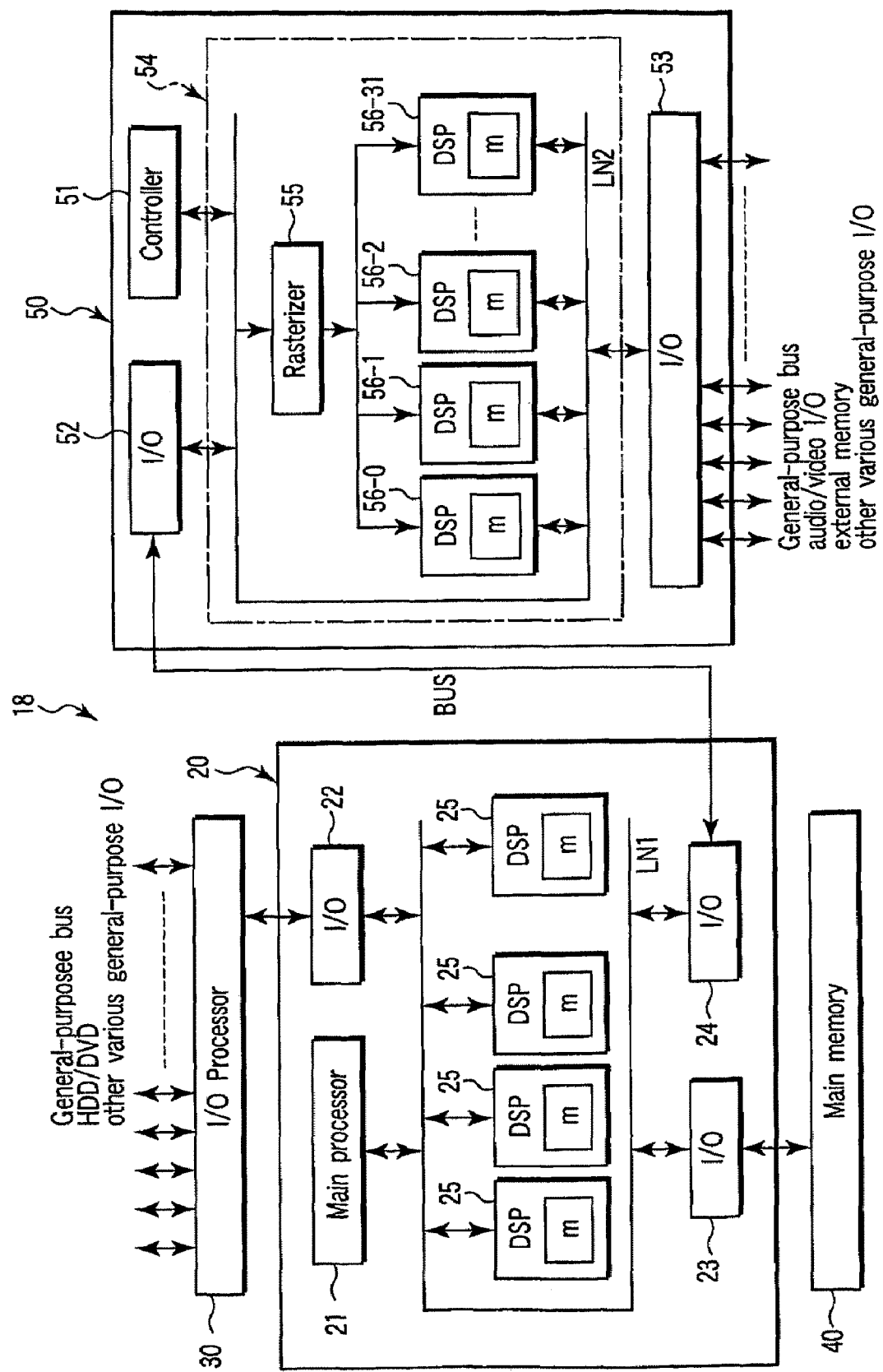
FIG. 36 is a block diagram of an image processor system LSI that includes an image processing method, an image processing program and an image processing computer according to a fourth embodiment of the invention.

Next, a description is given of an image processing method and an image processing program product according to a fourth embodiment of the invention. In this fourth embodiment, the image process described in the first to third embodiments is realized by an image processing LSI, and not by a software process. FIG. 36 is a block diagram of a system LSI according to this embodiment.

As is shown in FIG. 36, an image drawing processor system LSI 118 comprises a host processor 20, an I/O processor 30, a main memory 40 and a graphic processor 50. The host processor 20 and graphic processor 50 are connected to be mutually communicable over a processor bus BUS.

The host processor 20 includes a main processor 21, I/O units 22, 23 and 24, and a plurality of digital signal processors (DSPs) 25. These circuit blocks are connected to be mutually communicable over a local network LN1. The main processor 21 controls the operations of the respective circuit blocks in the host processor 20. The I/O unit 22 executes transmission/reception of data with the outside of the host processor 20 via the I/O processor 30. The I/O unit 23 executes data transmission/reception with the main memory 40. The I/O unit 24 executes data transmission/reception with the graphic processor 50 via the processor bus BUS. The digital signal processors 25 executes signal processing on the basis of data that is read in from the main memory 40 or from outside.

The I/O processor 30 connects the host processor 20 to, for instance, a general-purpose bus, a peripheral unit such as an HDD or a DVD (Digital Versatile Disc) drive, and a network. In this case, the HDD or DVD drive may be mounted on the LSI 18 or may be provided outside the LSI 18.

The main memory 40 stores a program that is necessary for the operation of the host processor 20. This program is read out of, e.g. an HDD (not shown), and loaded in the main memory 40.

The graphic processor 50 includes a controller 51, I/O units 52 and 53, and an arithmetic process unit 54. The controller 51 executes, for example, communication with the host processor 20 and a control of the arithmetic process unit 54. The I/O unit 52 controls input/output from/to the host processor 20 via the processor bus BUS. The I/O unit 53 controls input/output from/to various general-purpose buses such as a PCI (Peripheral Component Interconnect), input/output of video and audio, and input/output from/to an external memory. The arithmetic process unit 54 executes an image processing arithmetic operation.

The arithmetic process unit 54 includes a rasterizer 55, and a plurality of digital signal processors (DSPs) 56-0 to 56-31. In this embodiment, the number of digital signal processors is set at 32, but this number is not limited. Alternatively, the number of digital signal processors may be 8, 16, 64, etc. The detailed structure of the arithmetic process unit 54 is described referring to FIG. 37. FIG. 37 is a block diagram of the graphic processor 50.

As is shown in FIG. 37, the arithmetic process unit 54 includes the rasterizer 55, and 32 digital signal processors 56-0 to 56-31. The rasterizer 55 generates pixels according to input graphic information. The pixel, in this context, is a minimum-unit area that is manipulated when a predetermined graphical figure is drawn. A figure is drawn by a set of pixels. The pixels to be generated are determined by the shape of a figure (i.e. positions occupied by the figure). To be more specific, when drawing is effected at a given position, a pixel corresponding to this position is generated. When drawing is effected at another position, another pixel corresponding to this position is generated. The digital signal processors 56-0 to 56-31 include pixel process units PPU0 to PPU31 and local memories LM0 to LM31, which are associated with the pixel process units PPU0 to PPU31, respectively.

Each of the pixel process units PPU0 to PPU31 includes four realize pipes RP that constitute a single RP cluster RPC (realize pipe cluster). The RP cluster RPC executes an SIMD (Single Instruction Multiple Data) operation and processes four pixels at a time. Pixels, which correspond to respective positions of a graphical figure, are assigned to the pixel process units PPU0 to PPU31. The pixel process units PPU0 to PPU31 process the associated pixels in accordance with the positions of the figure.

The local memories LM0 to LM31 store pixel data that are generated by the pixel process units PPU0 to PPU31. The local memories LM0 to LM31, as a whole, constitute a realize memory. The realize memory is, for instance, a DRAM. The DRAM includes memory areas each having a predetermined data width, and these memory areas correspond to the local memories LM0 to LM31.

In the graphic processor 50 with the above-described structure, polygonized object data is input to the I/O unit 52 or 53. Based on the input data, the rasterizer 55 executes a division process (step S11, S12) for dividing an n-angular (n>3) polygon into triangular-shaped polygons, an extraction process (step S13) for extracting vertex coordinates of a triangular-shaped polygon, and a setting process (step S14) for setting a bounding box or a bounding sphere. The rasterizer 55 delivers the obtained information to the digital signal processors 56-0 to 56-31. The digital signal processors 56-0 to 56-31 execute parallel processors for different bounding boxes (polygons) (steps S15 to S18). In the digital signal processors 56-0 to 56-31, the plural realize pipes RP can execute parallel processes for a plurality of lattice points. On the basis of the signed minimum distances $D(r\rightarrow)$ obtained by the digital signal processors 56-0 to 56-31, an object is rendered by implicit-function representation. The signed minimum distances $D(r\rightarrow)$ are stored in the local memories LM0 to LM31. In addition, the digital signal processors 56-0 to 56-31 can execute the process of steps S32 to S34, which has been described in connection with the second embodiment. In this case, for example, the rasterizer 55 executes the process of steps S30, S31, S35, S36 and S37, and the lattice-setting number-of-times k is stored in any one of the memories. Furthermore, the digital signal processors 56-0 to 56-31 can execute the process of steps S40 to S45, which has been described in connection with the third embodiment.

As has been described above, the processes that have been described in connection with the first to third embodiments can be carried out using the image processor according to the present embodiment.

According to the image process method, image process program product and image processing computer of the first to fourth embodiments of the invention, the bounding box is generated for each of the triangular-shaped polygons, and the signed minimum distances D(r→) from the lattice point to the triangular-shaped polygon is found. By overlapping the signed minimum distances D(r→) associated with all triangular-shaped polygons, the object is represented. Specifically, a set of points with D(r→)=0 forms a surface of an object, and the set of the points meets an implicit function φ(r→)=0. Thus, in the method according to the embodiments of the invention, the implicit function φ(r→)=0 is not directly found. However, by searching for the set of D(r→)=0, the implicit function φ(r→)=0 is substantially obtained. According to the present method, even where an object has a complex shape, an implicit-function representation of the object can surely be obtained, and an implicit-function representation method with high versatility in use can be provided.

In the method according to the embodiments, the object surface is defined by discrete lattice points, as shown in FIG. 7. Thus, when the process illustrated in FIG. 10 to FIG. 13 is executed, lattice points are not necessarily present on the triangular-shaped polygon. In such a case, an approximation process is performed, an a nearest lattice point that is not on the triangular-shaped polygon may be used as a point that meets D(r→)=0.

Not only the implicit function φ(r→), but also ∇φ(r→) may be found at the same time. Thereby, even at a position where no lattice point is present, φ(r→) can be supplemented by a cubic polynomial and its value can be found. In this case, ∇φ(r→) is given by $$\nabla \phi(\vec{r}) = \left(\frac{\partial \phi}{\partial x}, \frac{\partial \phi}{\partial y}, \frac{\partial \phi}{\partial z}\right), \left(\frac{\partial^2 \phi}{\partial x \partial y}, \frac{\partial^2 \phi}{\partial y \partial z}, \frac{\partial^2 \phi}{\partial x \partial z}, \frac{\partial^3 \phi}{\partial x \partial y \partial z}\right)$$

In the above-described embodiments, the implicit function φ(r→)=0 is obtained on the basis of the signed minimum distances D(r→) associated with all lattice points included in the bounding box. However, in order to represent an object surface, it should suffice if the implicit function φ(r→) is obtained on the basis of the signed minimum distances D(r→) associated with lattice points that are present within a distance of less than ε from the triangular-shaped polygon. As regards lattice points at a distance of more than ε from the triangular-shaped polygon, it should suffice if the signed minimum distance D(r→) has an equal signed function sgn (z') and an absolute value greater than ε. Thus, φ(r→) can be found by simple extrapolation. In addition, when φ(r→) is obtained using the lattice points at a distance of more than ε from the triangular-shaped polygon, re-initialization may be executed. The re-initialization, in this context, refers to correction that is executed when φ(r→) of the implicit function φ(r→)=0 fails to meet the property of the signed minimum distance function. The re-initialization is executed by performing a steady-state calculation for τ in the following equation:

$$\frac{\partial \phi}{\partial \tau} = S(\phi_{\tau=0})(1 - |\nabla \phi|)$$

where τ is a time step. The re-initialization is executed to prevent the shape, which is represented by the implicit function, from failing to meet the property of the signed distance function when the shape varies with time. Accordingly, a variable relating to time is included in the equation. In addition, S(φ_τ=0) is an approximate function of the signed function sgn and is given by $$S(\phi) = \frac{\phi}{\sqrt{\phi^2 + \delta^2}} \approx \text{sgn}(\phi)$$

where δ is a value that is close to 2ε, and this equation is established when δ is sufficiently small.

In the above-described embodiments, all polygons are triangular-shaped polygons. However, needless to say, a rectangular-shaped polygon may be used as it is. In this case, the signed minimum distances D(r→) from two triangular polygons that are included in the rectangular-shaped polygon may be overlapped.

Figure 38:
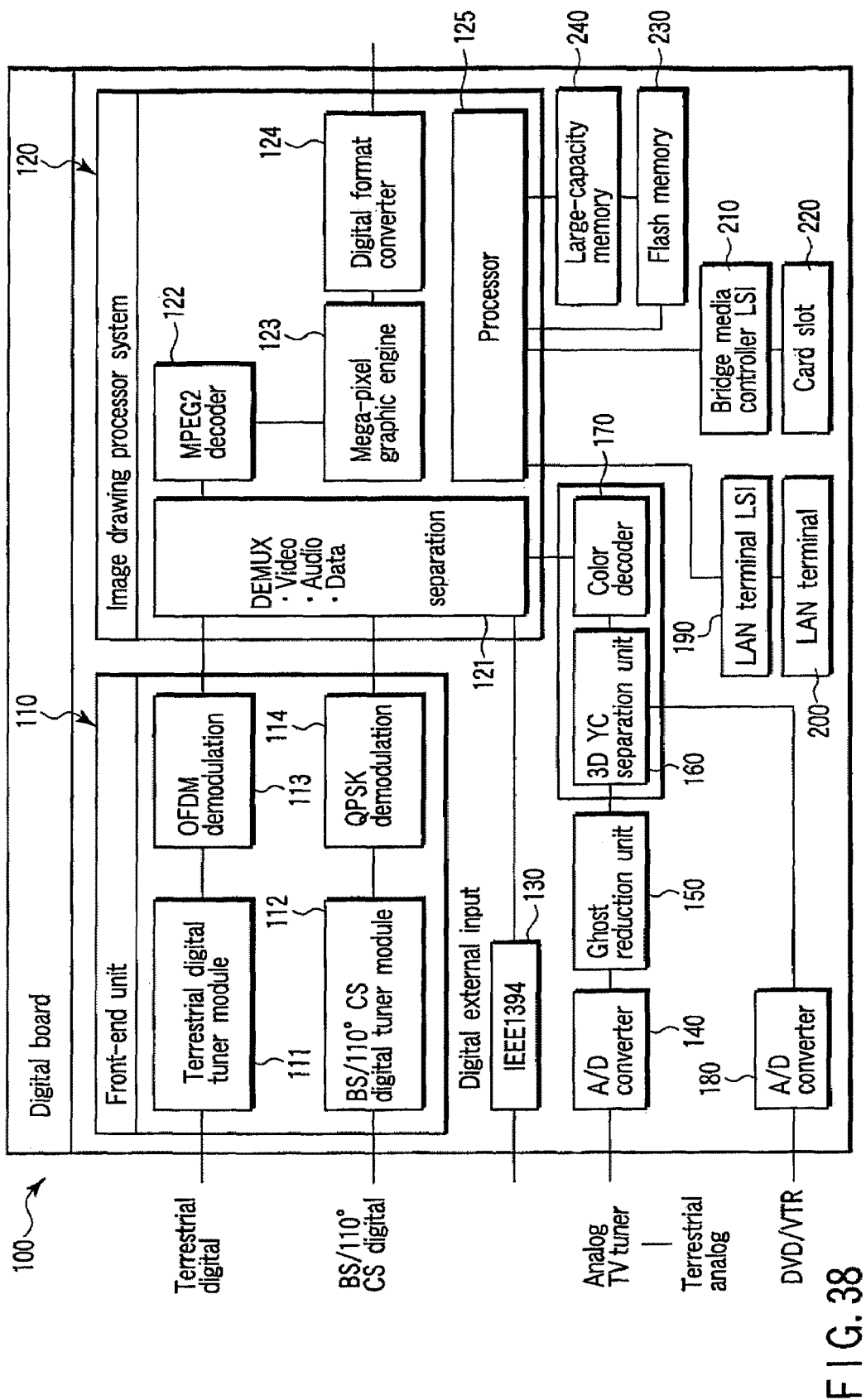
FIG. 38 is a block diagram of a digital board of a digital TV that includes the image processing method, image processing program and image processing computer according to the first to third embodiments.

The image process program products, image processing computers or system LSIs according to the first to fourth embodiments are applicable to, e.g. game machines, home servers, TVs, mobile information terminals, etc. FIG. 38 is a block diagram of a digital board included in a digital TV that executes the image processing methods according to the first to fourth embodiments. The digital board is employed to control communication information such as video/audio. As is shown in FIG. 38, the digital board 100 comprises a front-end unit 110, an image drawing processor system 120, a digital input unit 130, A/D converters 140 and 180, a ghost reduction unit 150, a 3D YC separation unit 160, a color decoder 170, a LAN process LSI 190, a LAN terminal 200, a bridge media controller LSI 210, a card slot 220, a flash memory 230, and a large-capacity memory (e.g. dynamic random access memory (DRAM)) 240. The front-end unit 110 includes digital tuner modules 111 and 112, an OFDM (Orthogonal Frequency Division Multiplex) demodulation unit 113, and a QPSK (Quadrature Phase Shift Keying) demodulation unit 114.

The image drawing processor system 120 comprises a transmission/reception circuit 121, an MPEG2 decoder 122, a graphic engine 123, a digital format converter 124, and a processor 125. For example, the graphic engine 123 and processor 125 correspond to the graphic processor 50 and host processor 20, which have been described in connection with the first to fourth embodiments.

In the above structure, terrestrial digital broadcasting waves, BS (Broadcast Satellite) digital broadcasting waves and 110-degree CS (Communications Satellite) digital broadcasting waves are demodulated by the front-end unit 110. In addition, terrestrial analog broadcasting waves and DVD/VTR signals are decoded by the 3D YC separation unit 160 and color decoder 170. The demodulated/decoded signals are input to the image drawing processor system 120 and are separated into video, audio and data by the transmission/reception circuit 121. As regards the video, video information is input to the graphic engine 123 via the MPEG2 decoder 122. The graphic engine 123 then renders an object by implicit-function representation by the method as described in the embodiments.

FIG. 39 is a block diagram of a recording/reproducing apparatus that executes the image processing methods as described in connection with the first to fourth embodiments. As is shown in FIG. 39, a recording/reproducing apparatus 300 comprises a head amplifier 310, a motor driver 320, a memory 330, an image information control circuit 340, a user I/F CPU 350, a flash memory 360, a display 370, a video output unit 380, and an audio output unit 390.

The image information control circuit 340 includes a memory interface 341, a digital signal processor 342, a processor 343, an audio processor 344, and a video processor 345.

With the above structure, video data that is read out of the head amplifier 310 is input to the image information control circuit 340. Then, graphic information is input from the digital signal processor 342 to the video processor 345. The video processor 345 draws an object by the methods described in the embodiments of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An image processing method using a computer including a CPU and a memory, comprising:
    causing the CPU to store data on an object represented by a plurality of polygons in the memory;
    causing the CPU to extract vertex coordinates of a first triangular-shaped polygon included in the object, the first triangular shaped polygon being one of the plurality of polygons;
    causing the CPU to set a region surrounding the first triangular shaped polygon on the basis of the vertex coordinates;
    causing the CPU to measure a first distance from a lattice point included in the region to the first triangular-shaped polygon;
    causing the CPU to determine whether the region includes a second triangular-shaped polygon or not, the second triangular-shaped polygon being one of the plurality of polygons;
    in a case where the region includes the second triangular-shaped polygon, causing the CPU to determine whether a second distance from the lattice point to the second triangular-shaped polygon is measured or not, the second triangular-shaped polygon being included in the object;
    in a case where the second distance is measured and the first distance differs from the second distance, causing the CPU to select smaller one of the first and second distances;
    in a case where the second distance is measured and the first distance is same as the second distance, causing the CPU to compare a first displacement between a first projection point of the lattice point on a first X-Y plane and a nearest lattice point with a second displacement between a second projection point of the lattice point on a second X-Y plane and a nearest lattice point, the first X-Y plane being a coordinate including a plane of the first triangular-shaped polygon, the second X-Y plane being a coordinate including a plane of the second triangular-shaped polygon;
    causing the CPU to select one of the first and second distance based on a comparison result between the first and second displacements:
    causing the CPU to draw a graphic figure on the basis of selected one of the first and second distances; and
    causing the CPU to output the drawn graphic figure as the data on the object.

2. The method according to claim 1, wherein the graphic figure is drawn as a set of points at which the selected one of the first and second distances is zero.

3. The method according to claim 1, wherein the first and second distances are given as data which is accompanied with a sign indicative of whether the lattice point is outside or inside the object.

4. The method according to claim 1, further comprising converting all of the plurality of polygons into triangular-shaped polygons, prior to the step of extracting the vertex coordinates of the first triangular-shaped polygon.

5. The method according to claim 1, further comprising:
    dividing a drawing region of the object into a plurality of meshes; and
    further dividing the mesh, in which an outline of the object is present, into a plurality of meshes,
    wherein said region is set for each of the meshes.

6. The method according to claim 2, wherein a surface of the graphic figure is drawn by transforming a parametric representation using the polygons to an implicit-function representation.

7. A computer program product stored on a memory for processing image data, comprising:
    means for instructing a computer to extract vertex coordinates of a triangular-shaped polygon;
    means for instructing a computer to store data on an object represented by a plurality of polygons in the memory;
    means for instructing a computer to extract vertex coordinates vertex coordinates of a first triangular-shaped polygon included in the object, the first triangular shaped polygon being one of the plurality of polygons;
    means for instructing the computer to generate a region surrounding the first triangular shaped polygon on the basis of the vertex coordinates;
    means for instructing the computer to measure a first distance from a lattice point included in the region to the first triangular-shaped polygon;
    means for instructing the computer to determine whether the region includes a second triangular-shaped polygon or not, the second triangular-shaped polygon being one of the plurality of polygons;
    means for instructing the computer to determine whether a second distance from the lattice point to the second triangular-shaped polygon is measured or not, the second triangular-shaped polygon being included in the object in a case where the region includes the second triangular-shaped polygon;
    means for instructing the computer to select smaller one of the first and second distances in a case where the second distance is measured and the first distance differs from the second distance;
    means for instructing the computer to compare a first displacement between a first projection point of the lattice point on a first X-Y Diane and a nearest lattice point with a second displacement between a second projection point of the lattice point on a second X-Y plane and a nearest lattice point in a case where the second distance is measured and the first distance is same as the second distance, the first X-Y plane being a coordinate including a plane of the first triangular-shaped polygon, the second X-Y plane being a coordinate including a plane of the second triangular-shaped polygon;

means for instructing the computer to select one of the first and second distance based on a comparison result between the first and second displacements;

means for instructing the computer to draw a graphic figure on the basis of selected one of the first and second distances; and means for instructing the computer to output the drawn graphic figure as the data on the object.

8. The product according to claim 7, wherein said means for instructing the computer to draw the graphic figure is configured such that the graphic figure is drawn as a set of points at which the selected one of the distances is zero.

9. The product according to claim 7, wherein said means for instructing the computer to measure the first distance is configured such that a distance from the lattice point to the first triangular-shaped polygon is given as data which is accompanied with a sign indicative of whether the lattice point is outside or inside the object.

10. The product according to claim 7, further comprising a means for instructing the computer to convert all of the plurality of polygons into triangular-shaped polygons, before the vertex coordinates of the first triangular-shaped polygon are extracted.

11. The product according to claim 7, further comprising:
means for instructing the computer to divide an image region including the object into a plurality of meshes; and means for instructing the computer to further divide the mesh, in which an outline of the object is present, into a plurality of meshes, wherein the means for instructing the computer to generate the region is configured such that the region is set for each of the meshes.

12. The product according to claim 8, wherein
a surface of the graphic figure, which is drawn by the means for instructing the computer to draw the graphic figure, is drawn by transforming a parametric representation using the polygons to an implicit-function representation.

13. An image processing apparatus comprising:
an input unit configured to receive data on an object represented by a plurality of polygons;

a processing unit configured to generate a region surrounding a first one of the polygons, measure a first distance from a lattice point included in the region to the first one of the polygons, determine whether the region includes a second triangular-shaped polygon or not, determine whether a second distance from the lattice point to the second triangular-shaped polygon is measured or not, select smaller one of the first and second distances in a case where the second distance is measured and the first distance differs from the second distance;

compare a first displacement between a first projection point of the lattice point on a first X-Y plane and a nearest lattice point with a second displacement between a second projection point of the lattice point on a second X-Y plane and a nearest lattice point in a case where the second distance is measured and the first distance is same as the second distance, the first X-Y plane being a coordinate including a plane of the first triangular-shaped polygon, the second X-Y plane being a coordinate including a plane of the second triangular-shaped polygon;

select one of the first and second distance based on a comparison result between the first and second displacements, and draw a graphic figure on the basis of selected one of the first and second distances by an implicit-function representation; and an outputting unit configured to display the graphic figure that is obtained by the implicit-function representation.

14. The apparatus according to claim 13, wherein the processing unit draws the graphic figure as a set of points at which the selected one of the first and second distances to the polygon is zero.

15. The apparatus according to claim 13, wherein the processing unit provides the first and second distances as data which is accompanied with a sign indicative of whether the lattice point is outside or inside the object.

16. The apparatus according to claim 13, wherein the processing unit converts all of the polygons into triangular-shaped polygons, extracts vertex coordinates of the triangular-shaped polygon, and generates the region based on the vertex coordinates.

17. The apparatus according to claim 13, wherein the processing unit divides an image region of the object, into a plurality of meshes, further divides the mesh, in which an outline of the object, into a plurality of meshes, and sets said region for each of the meshes.

18. The method according to claim 1, wherein if the first displacement is smaller than the second displacement, the CPU selects the first distance,
if the second displacement is smaller than the first displacement, the CPU selects the second distance.

19. The product according to claim 7, wherein if the first displacement is smaller than the second displacement, the computer selects the first distance,
if the second displacement is smaller than the first displacement, the computer selects the second distance.

20. The apparatus according to claim 13, wherein if the first displacement is smaller than the second displacement, the processing unit selects the first distance,
if the second displacement is smaller than the first displacement, the processing unit selects the second distance.

* * * * *